Sept. 7, 1965 S. P. BURNS ETAL 3,204,579

RAILCAR

Filed Sept. 30, 1963 22 Sheets-Sheet 1

INVENTORS
Samuel P. Burns
Robert H. Bauer
BY
Harness, Dickey & Pierce
ATTORNEYS

Sept. 7, 1965 S. P. BURNS ETAL 3,204,579

RAILCAR

Filed Sept. 30, 1963

22 Sheets-Sheet 2

INVENTORS.
Samuel P. Burns
Robert H. Bauer
BY
Harness, Dickey & Pierce
ATTORNEYS.

Sept. 7, 1965 S. P. BURNS ETAL 3,204,579

RAILCAR

Filed Sept. 30, 1963 22 Sheets-Sheet 3

INVENTORS.
Samuel P. Burns
Robert H. Bauer
BY
Harness, Dickey & Pierce
ATTORNEYS.

INVENTORS
Samuel P. Burns
Robert H. Bauer
BY
Harness, Dickey & Pierce
ATTORNEYS.

RAILCAR

Filed Sept. 30, 1963

INVENTORS
Samuel P. Burns
Robert H. Bauer
BY
Harness, Dickey & Pierce
ATTORNEYS

INVENTORS.
Samuel P. Burns.
Robert H. Bauer.
BY
Harness, Dickey & Pierce
ATTORNEYS.

INVENTORS.
Samuel P. Burns
Robert H. Bauer
BY
Harness, Dickey & Pierce
ATTORNEYS.

RAILCAR

Filed Sept. 30, 1963 22 Sheets-Sheet 8

INVENTORS.
Samuel P. Burns
Robert H. Bauer
BY
Harness, Dickey & Pierce
ATTORNEYS

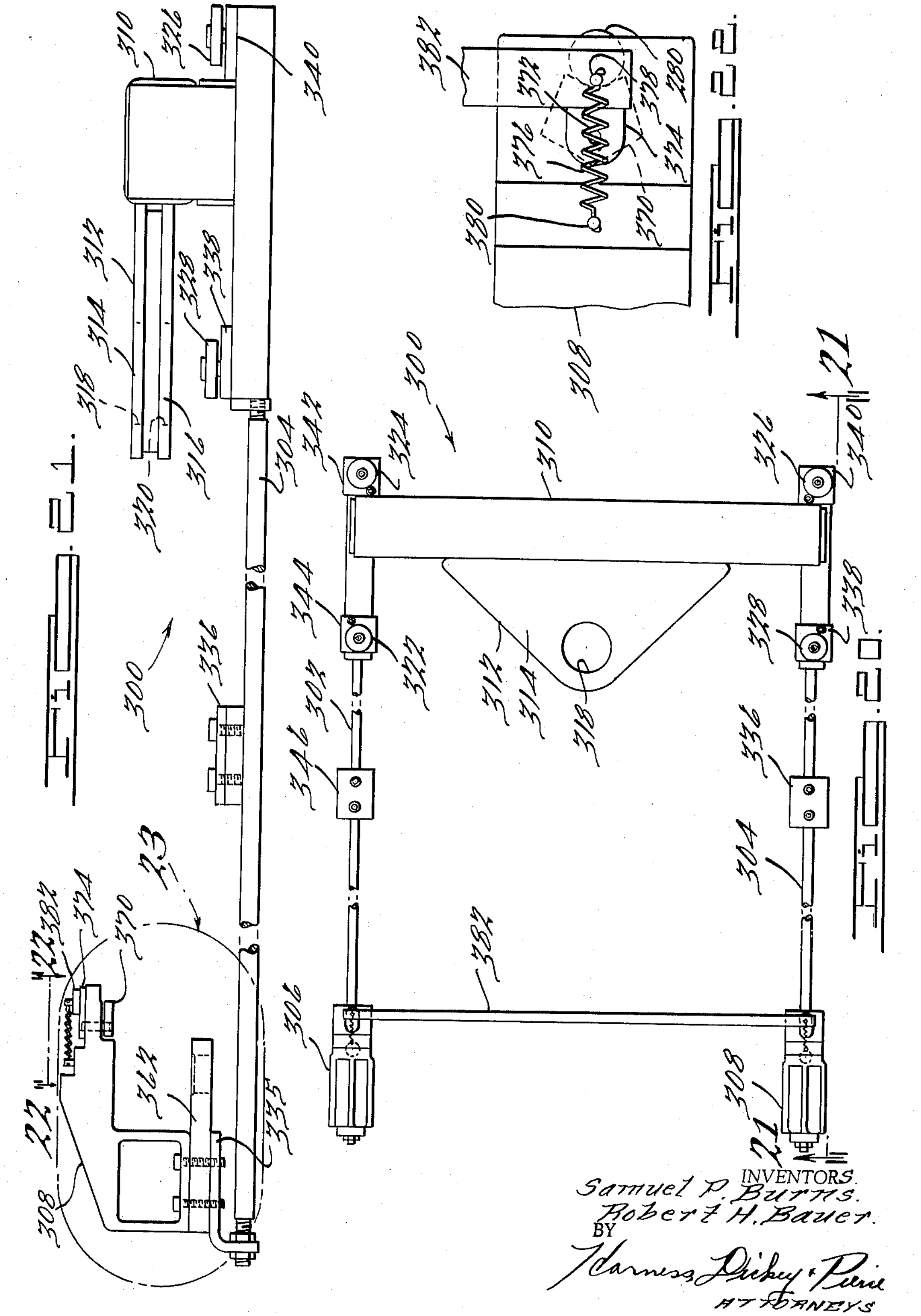
INVENTORS.
Samuel P. Burns.
Robert H. Bauer.
BY
Harness, Dickey & Pierce
ATTORNEYS

RAILCAR

Filed Sept. 30, 1963

22 Sheets-Sheet 10

INVENTORS.
Samuel P. Burns.
Robert H. Bauer.
BY
Harness, Dickey & Pierce
ATTORNEYS.

Sept. 7, 1965 S. P. BURNS ETAL 3,204,579
RAILCAR
Filed Sept. 30, 1963 22 Sheets-Sheet 11
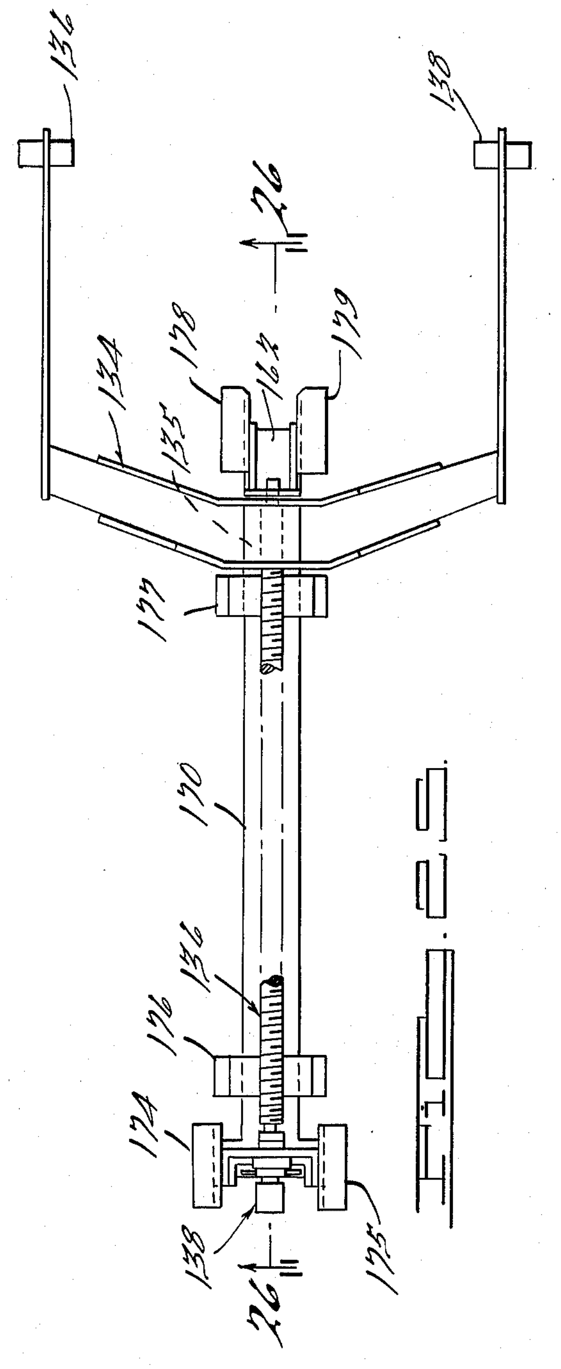
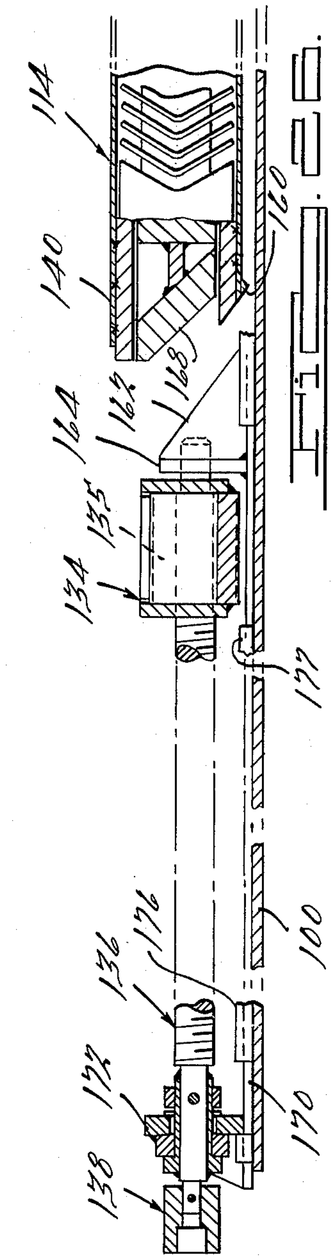
INVENTORS.
Samuel P. Burns
Robert H. Bauer
BY
Harness, Dickey & Pierce
ATTORNEYS INVENTORS
Samuel P. Burns
Robert H. Bauer
BY
Harness, Dickey & Pierce
ATTORNEYS.

Sept. 7, 1965 S. P. BURNS ETAL 3,204,579

RAILCAR

Filed Sept. 30, 1963 22 Sheets-Sheet 13

INVENTORS.
Samuel P. Burns
Robert H. Bauer
BY Harness, Dickey & Pierce
ATTORNEYS.

Sept. 7, 1965 S. P. BURNS ETAL 3,204,579
RAILCAR
Filed Sept. 30, 1963 22 Sheets-Sheet 14

INVENTORS
Samuel P. Burns
Robert H. Bauer
BY
Harness, Dickey & Pierce
ATTORNEYS.

Sept. 7, 1965 S. P. BURNS ETAL 3,204,579

RAILCAR

Filed Sept. 30, 1963 22 Sheets-Sheet 15

INVENTORS.
Samuel P. Burns.
Robert H. Bauer.
BY
Harness, Dickey + Pierce
ATTORNEYS.

RAILCAR

Filed Sept. 30, 1963

INVENTORS.
Samuel P. Burns.
Robert H. Bauer.
BY
Harness, Dickey & Pierce
ATTORNEYS.

INVENTORS.
Samuel P. Burns
Robert H. Bauer
BY
Harness, Dickey & Pierce
ATTORNEYS INVENTORS.
Samuel P. Burns.
Robert H. Bauer.
BY
Harness, Dickey & Pierce
ATTORNEYS.

INVENTORS.
Samuel P. Burns
Robert H. Bauer
BY
Harness, Dickey & Pierce
ATTORNEYS INVENTORS
Samuel P. Burns
Robert H. Bauer
BY
Darness, Dickey & Pierce
ATTORNEYS

RAILCAR

Filed Sept. 30, 1963

INVENTORS.
Samuel P. Burns
Robert H. Bauer
BY
Harness, Dickey & Pierce
ATTORNEYS.

RAILCAR

Filed Sept. 30, 1963

22 Sheets-Sheet 22

INVENTORS.
Samuel P. Burns.
Robert H. Bauer.
BY
Harness, Dickey + Pierce
ATTORNEYS.

3,204,579
RAILCAR

Samuel P. Burns, Fraser, and Robert H. Bauer, Dearborn, Mich., assignors to Fruehauf Corporation, Detroit, Mich., a corporation of Michigan Filed Sept. 30, 1963, Ser. No. 312,406
1 Claim. (Cl. 105—368)

This invention relates generally to railway transportation equipment, and more particularly to an improved multi-purpose railcar.

The advent of containerized shipping has emphasized the need for an improved container handling railcar capable of use with several of the now existing modes of containerized shipping thereby to maximize the efficiency and use of such containers. The advantages of containerized shipping are obviously lost when a shipper is forced to utilize single purpose handling equipment which is incompatible with other containerized shipping systems. The resultant duplication of equipment having a similar function but of different dimensional mechanical characteristics results ultimately in increased shipping costs which are passed along to the consumer.

The present invention is directed to a railcar that is compatible with three prominent modes of containerized shipment, namely, "piggyback" shipment wherein an entire semi-trailer including the rear wheel suspension is mounted on a railcar; "Flexi-Van" shipment wherein a container is removed from its wheel suspension and mounted directly on the railcar on a complementary turntable and kingpin stanchion or hitch; and "lift-on"–"lift-off" service, wherein containers are hoisted to and from a rail car by an overhead crane or the like and secured to the railcar by suitable tie-down apparatus.

A number of specific requirements are promulgated by the application of a railcar to the aforementioned shipping systems, which requirements not only are satisfied by the instant invention but met to a heretofore unknown degree.

In order to be compatible with the three aforementioned modes of container shipment, as well as to have maximum utility as a conventional flat car, a railcar in accordance with the instant invention comprises a long relatively flat car having a minimum of obstructions above normal deck height.

The car is provided with substantially continuous outboard safety tie-down chain anchors along both sides for the securement of containers carried thereon.

All superstructure required for a particular mode of transportation is securable to the surface of the railcar thereby to handle containers of any known size and weight within the car unit loading and railway clearance restrictions.

The railcar affords a maximum degree of protection to lading as well as to the lading container coupled with minimum displacement between adjacent containers thereby to permit shipment of longer loads on a given railcar length.

The railcar provides longitudinal, lateral, and vertical shock absorption to a degree that permits the use of standard highway trailers and/or containers used in normal railroad interchange operation. Furthermore, sufficient shock absorption is provided that operation of the railcar is possible with lading superimposed thereon in railroad classification yards wherein the railcars are accelerated to relatively high velocities and subjected to sudden stoppage. Also, the shock protection afforded eliminates the need for auxiliary lading protection devices and permits the use of standard brake systems.

Since there is increasing pressure to increase the width of over-the-road trailers and containers from 8 feet to 8 feet 6 inches wide, the railcar of the instant invention is designed to handle such wider equipment without requiring modification.

The railcar of the instant invention utilizes end-of-car hydraulic draft gear units which are self-contained so as to be readily installed and serviced both as original equipment and as a field serviced item. Such draft gears function in combination with secondary elastic shock mounts on the railcar for the support and securement of lading thereby to reduce lading forces to within safe impact zones. Such draft gears also have the feature that the rate of energy absorption increases with increases in impact velocity. Theoretically, the hydraulic stroke and metered orifice arrangement prohibits bottoming action at any impact velocity to which the railcar is subjected. Also the point of surge or maximum rate of deceleration is tuned to the impulse cycle period of the secondary elastic shock mount system in such a manner as to produce minimum peak reaction forces on the lading. Furthermore, the combination of hydraulic draft gear units with a secondary elastic shock mounting system gives greater protection to the railcar structure itself. Also, the combination of hydraulic gear units and a secondary elastic shock mounting system maximizes curve negotiability commensurate with adequate lading protection.

As discussed hereinbefore the special purpose equipment on the railcar of the instant invention has been engineered to operate and function in various combinations to load, locate and secure two trailers in piggyback service, two containers in Flexi-Van service, two or more containers in lift on-lift off service, or any mixture of trailers and containers where routing and terminal facilities permit such an arrangement. Thus, a full equipped combination railcar will accommodate either eight 10′ containers, four 20′ containers, two 30′ containers, two 35′ containers, two 36′ containers, or two 40′ containers.

In order to facilitate handling of both Flexi-Van type containers and "piggyback" over-the-road equipment, the railcar of the instant invention features a combination hitch useable in both the piggyback and Flexi-Van configurations. The hitch is rigged differently for the two modes of service.

The hitch is capable of movement in translation longitudinally along the center line of the railcar for a distance of approximately 5 feet which freedom is proved to compensate for various lengths of trailers and for various locations of trailer kingpins. Further, variations due to manufacturing tolerances and for dynamic travel of the elastic secondary shock mountings must be compensated for.

The dual purpose kingpin stanchion is normally retractable to a height of 5⅝″ above deck. The nominal erected height of the coupler contact surface on the stanchion of the hitch is 47″ above deck surface. In this attitude, the front of a trailer is supported directly through vertically positioned support legs. A telescoping rubber cushioned strut leg reacts against longitudinal forces. Actuation of one lead screw either elevates or collapses the kingpin stanchion of the hitch. Actuation of a second lead screw either secures or releases the trailer kingpin. Actuation of lead screws is performed with electric torque wrenches presently available at most rail terminals.

The hitch operates as an oscillating kingpin receiver and front of container support in Flexi-Van service. Longitudinal positioning of the Flexi-Van container is accomplished by securement thereof to a turntable at the rear of the railcar. The stanchion of the hitch is engineered to oscillate in the longitudinal direction to compensate for cushion travel inherent in the turntable.

An auxiliary vertical support leg arrangement is provided to erect the coupler contact surface of the kingpin stanchion 10⅝″ above deck surface. Erection is accomplished by actuation of the same elevating screw as provided for piggyback service.

Oscillation of the kingpin receiver is necessary in order to accomplish the side loading and unloading of Flexi-Van containers. Thus, the entire hitch including the kingpin stanchion assembly oscillates laterally either to the right or left of the railcar to transfer the front end of the container between the tractor fifth wheel and the railcar. Securement of the container kingpin is accomplished by operation of the same locking device as used for piggyback service. Vertical and lateral securement of the stanchion to the railcar is automatic when centered.

In piggyback and lift on-lift off container services, the Flexi-Van turntable of the railcar is rigged in its stowed position and the sides thereof align to center wheel guide curbs on the railcar deck. When rigged for Flexi-Van service, the turntable provides the necessary sloped lead on rails, rear of container support rails, a container to turntable positioning and shot pin actuation system which positions and secures the container, and a center of car pivot for table rotation.

The turntable is secured to the railcar through a center of car pivot which depends from a generally diamond shaped inner frame structure. An outer frame structure incorporates the container support and securement devices. Four large rubber cushioned mounts loaded in combination compression and shear join the inner and outer structures. These mounts have dual functions as a device to compensate for mechanical misalignment and angular deflections in the loading process and also to provide lading and container protection due to their longitudinal lateral and vertical cushioned displacement.

When the railcar is rigged for lift on-lift off container service a rubber shock type mount adapter assembly is utilized for securement of containers to the railcar. The shock mounts have been engineered to conform to the container size standards adopted by the American Standards Association and to the proposed standards under current consideration for container corner castings, fittings and handling equipment. Provision has also been made to secure containers of different lengths by the same corner securement method.

The height of the bottom of the containers above the deck surface in lift on-lift off service is nominally 6¾″. The primary function of the rubber shock mounts is to equalize the applied load onto the four corner mounts and to adjust for alignment with holes in the container. They also provide lading and container structure protection due to their longitudinal, lateral and vertical cushioned displacement.

The railcar is provided with center wheel guide curbs to facilitate piggyback service. Continuous length curbs are provided on opposite sides of the center line of the railcar at a spacing of 44″. The sides of the combination hitch and the turntable align to the outside surfaces of the curbs.

The railcar provides two types of bridge plate installations. One installation features an aluminum bridge plate consisting of a fabricated plate, handle and stowage device. Due to the light weight of the bridge plate it is unnecessary to either counterbalance the plate or to provide a shock mount in the stowage system.

A steel bridge plate construction is also provided consisting of a fabricated plate, handle, stowage system and counterbalance. An above deck torsional bar counterbalance system is employed, a shock type mount being provided in the stowage system which permits both outboard and inboard oscillations of over 10° from a neutral stowed attitude.

Due to the utilization of a long travel hydraulic draft gear unit, the bridge plates are longer than provided as standard on trailer, train or equivalent railcars. Thus, bridge plate extensions are provided to support outboard ends of bridge plates from connected cars. These consist of a steel extension, handle and stowage device. The primary purpose of the handle is to provide a suitable hand grab during operation of the side-of-car flush deck mounted hand brake as a safety device. The bridge plates and extensions are engineered to carry single tire loads in excess of 20,000 pounds.

Safety chains are provided on the railcar to suit customer specifications. The chain anchors have been engineered to provide chain anchor locations at two sections on each side of the railcar starting at 20′4″ behind the center line of the kingpin locking device in each combination hitch in erected attitude and continuing at 6″ intervals for an additional 12′6″. The chain anchors transfer chain loads directly into the side sill channels of the railcar without loading the retention guide rod. The chain anchor is entirely recessed into the side sill channel when the chain is stowed in the chain box thereby removing all obstructions.

The chain stowage box is located adjacent to the chain anchor section toward one end of car and is concealed in the side sill channel. V notches and slots are provided at the top of the box walls to retain links of the chain.

Accordingly, the broad object of the instant invention is a multi-purpose railcar capable of handling three modes of containerized shipping, namely, piggyback semi-trailers, Flexi-Van shipping containers and lift on-lift off shipping containers.

Another object is a railcar in accordance with the previous object that is useable as a conventional flat car.

Another object is a railcar having a multi-purpose hitch or kingpin stanchion useable in different modes of shipment.

Another object is an improved multi-purpose hitch capable of movement laterally of a railcar to effect engagement with a Flexi-Van container.

Another object is a multi-purpose hitch that is elevatable to a plurality of different heights for engagement of containers in different modes of shipment.

Another object is an improved turntable for handling Flexi-Van containers.

Another object is a turntable having an improved secondary shock mount system.

Another object is a turntable having foldable arms.

Another object is an improved pyramid lock for the acceptance of lift on-lift off containers.

Yet another object is an improved bridge for the end of a railcar.

Other objects and advantages of the instant invention will be apparent in the following specification, claim and drawings, wherein:

FIGURE 20 is a view taken substantially in the direction of the arrow 20 of FIGURE 17 with the positioning mechanism removed from its complementary ways in the railcar deck.

FIGURE 21 is a view taken substantially along the line 21—21 of FIGURE 20.

FIGURE 22 is a view taken substantially along the line 22—22 of FIGURE 21.

FIGURE 25 is a top plan view, similar to FIGURE 11, showing the yoke and lead screw assembly removed from the plate of the hitch.

FIGURE 26 is a view taken substantially along the line 26—26 of FIGURE 25.

Figures 1, 2:
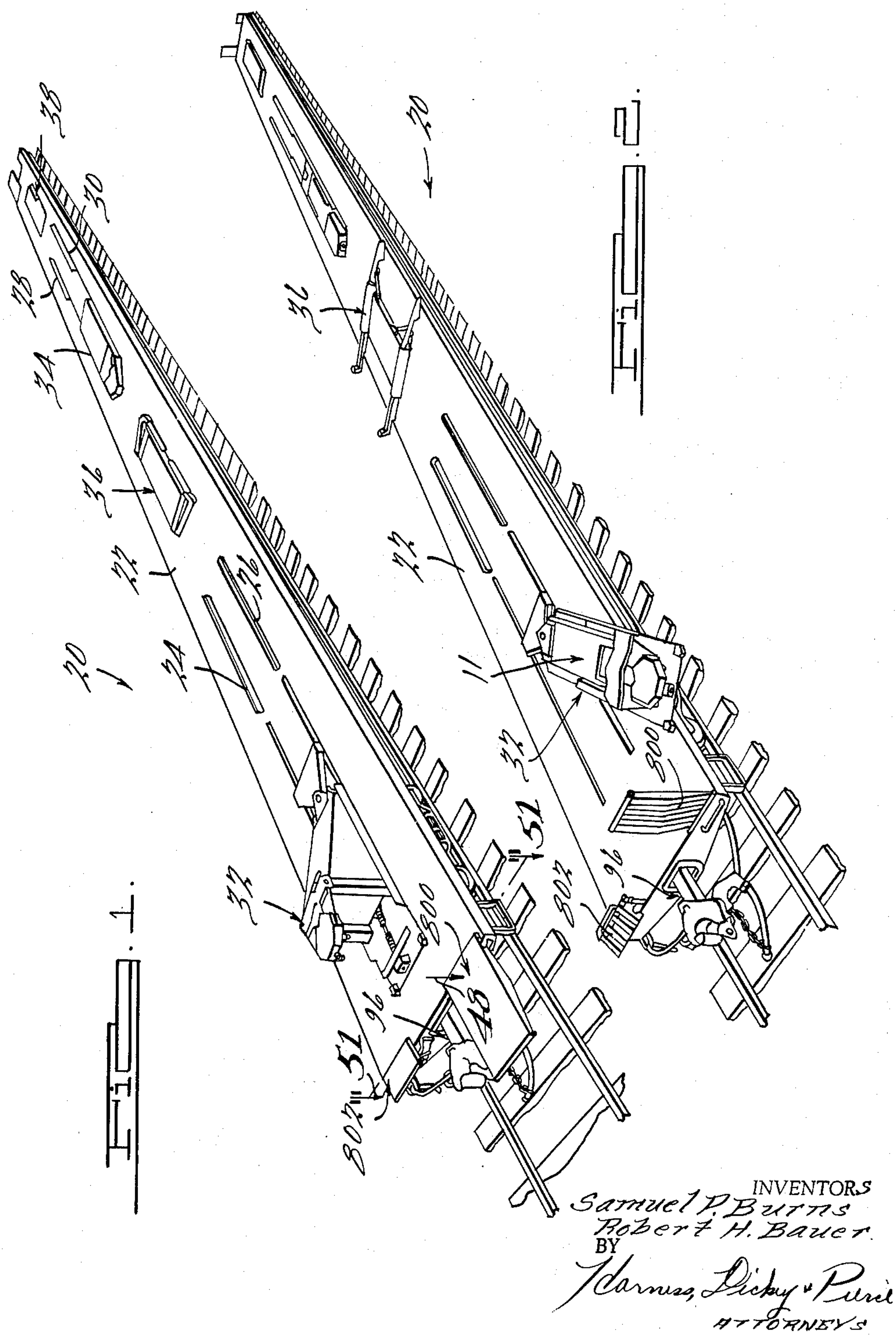
FIGURE 1 is a perspective view of a multi-purpose railcar in accordance with an exemplary constructed embodiment of the instant invention rigged for the acceptance of a piggyback semi-trailer.
FIGURE 2 is a perspective view, similar to FIGURE 1, showing the railcar rigged for the acceptance of a Flexi-Van container.

As best seen in FIGURE 1 of the drawings, a multi-purpose railcar 20, in accordance with an exemplary constructed embodiment of the instant invention, features a relatively clean flat deck 22 to which a number of special purpose equipment installations are secured, as will be described. The special purpose equipment comprises spaced parallel pairs of wheel guide curbs 24, 26, 28 and 30, a pair of kingpin hitches or stanchions 32 and 34 at opposite ends of the railcar 20, and a pair of turntables 36 and 38 which, in combination with the kingpin hitches 32 and 34, respectively, condition the railcar for operation in the Flexi-Van configuration. It is to be noted that the aforementioned components form a plurality of fixed and relocatable curb sections that amount to a continuous center of car wheel guide system to guide trailers on to the railcar 20 when the railcar 20 is in the piggy-back configuration. It is also to be noted that when the hitches 32 and 34 are lowered, the railcar 20 presents a minimum of above deck obstructions to facilitate operation of the railcar 20 in the lift on-lift off configuration or as a general purpose flat car.

As seen in FIGURE 2 of the drawings, forward portion of the railcar 20 is conditioned for the acceptance of a Flexi-Van container. Thus, the turntable 36 is rotated to the accepting condition, as will be described in more detail hereinafter. The kingpin hitch 32 is elevated to the Flexi-Van position, as will be more particularly described, and rotated laterally of the deck 22 to accept the kingpin of the Flexi-Van container as it moves toward the railcar 20.

Figure 3:
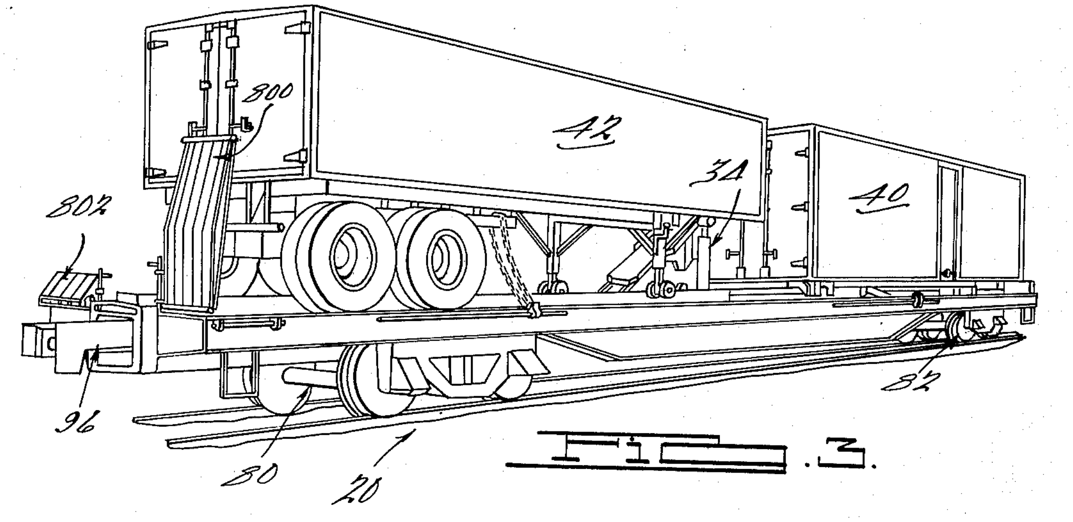
FIGURE 3 is a perspective view showing the railcar in the ready-to-roll condition with a piggyback semi-trailer and Flexi-Van container mounted thereon.
Figure 4:
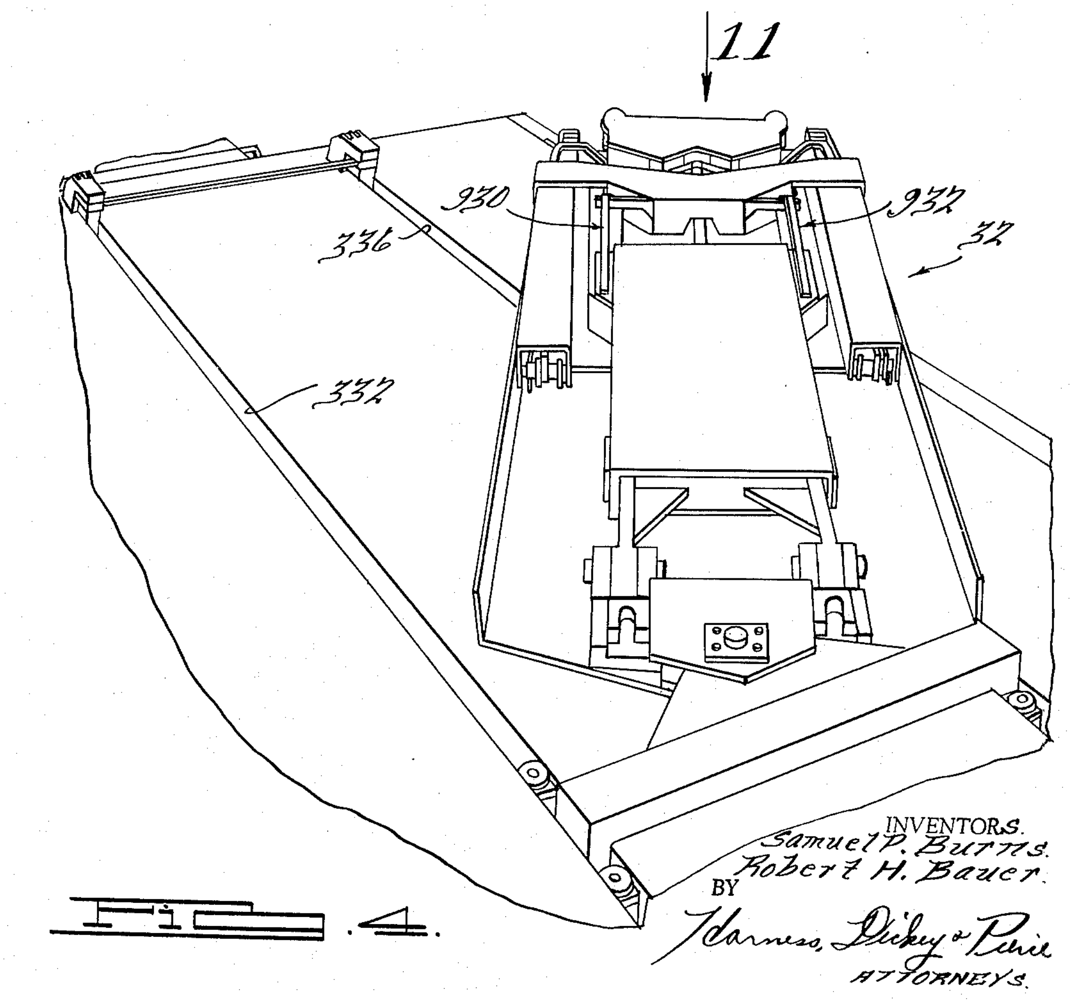
FIGURE 4 is a perspective view of the improved multi-purpose hitch of the instant invention shown in the laterally cocked position for the acceptance of a kingpin of a Flexi-Van container.

As best seen in FIGURE 3, a Flexi-Van container 40 is mounted on one end of the car 20 and a piggyback trailer 42 is mounted on the other end, the kingpin thereof being supported by the hitch 34.

As best seen in FIGURES 5 to 10, the rail car 20 comprises a box-like center sill 50 having horizontally spaced vertically extending web plates 52 and 54, a top plate 56 and a bottom plate 58. A plurality of cross members 60 are secured to the center sill 50 and extend laterally of the center sill 50. The cross members 60 comprises I-beams that continue through pierced apertures 62 in the center sill webs 52 and 54 and are welded thereto. A plurality of longitudinally extending stringers 64, 66, 68 and 70 are secured to the cross members 60 as by welding for the support of a deck plate 72. A pair of side sills 74 and 76 are secured to the ends of the cross members 60 and deck plate 72 to define the outboard edges of the rail car 20.

A pair of conventional rail car trucks 80 and 82 having, for example, 33" diameter wrought iron steel wheels and 70-ton axles of standard construction are provided. The trucks 80 and 82 pivotally seat and accept an annular bearing plate 90 that is secured to the bottom plate 58 of the car 20 as by welding.

Figure 6:
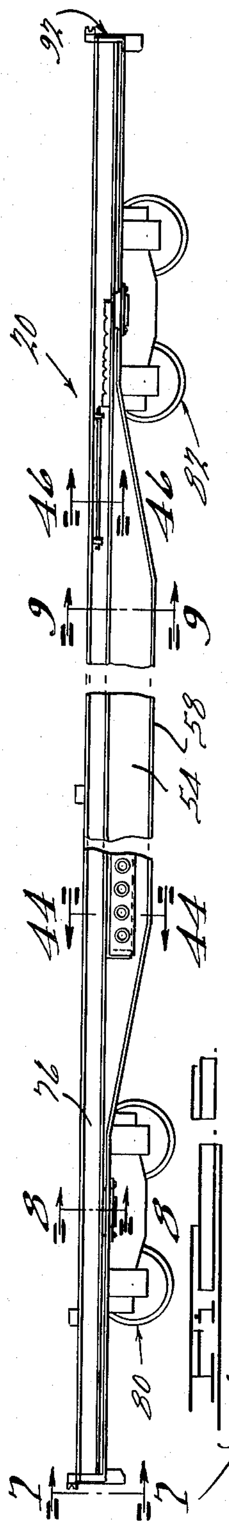
FIGURE 6 is a side elevational view of the railcar of FIGURE 5.
Figure 7:
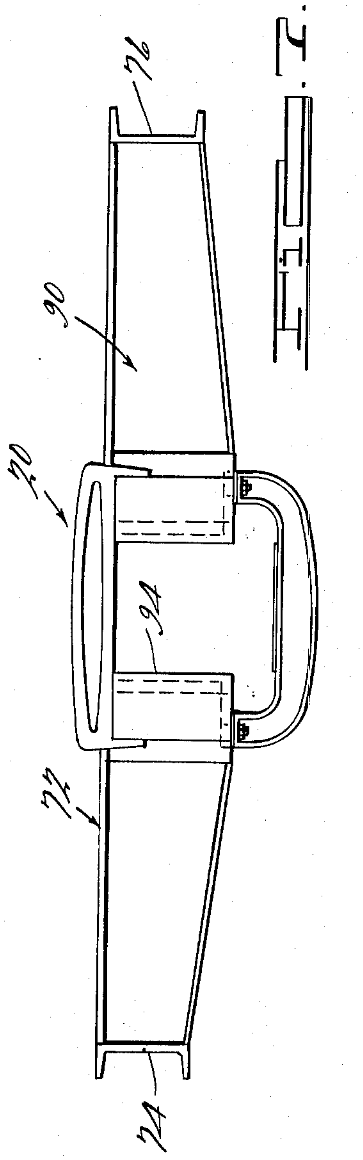
FIGURE 7 is a view taken substantially along the line 7—7 of FIGURE 6.
Figure 8:
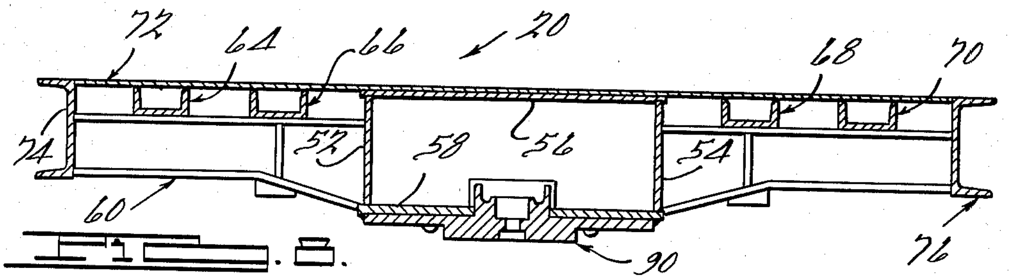
FIGURE 8 is a cross sectional view taken substantially along the line 8—8 of FIGURE 6.
Figure 9:
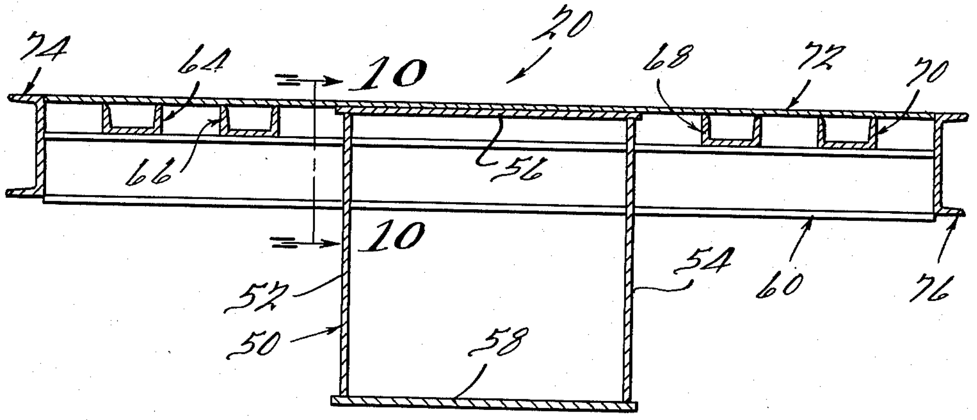
FIGURE 9 is a cross sectional view taken substantially along the line 9—9 of FIGURE 6.
Figure 10:
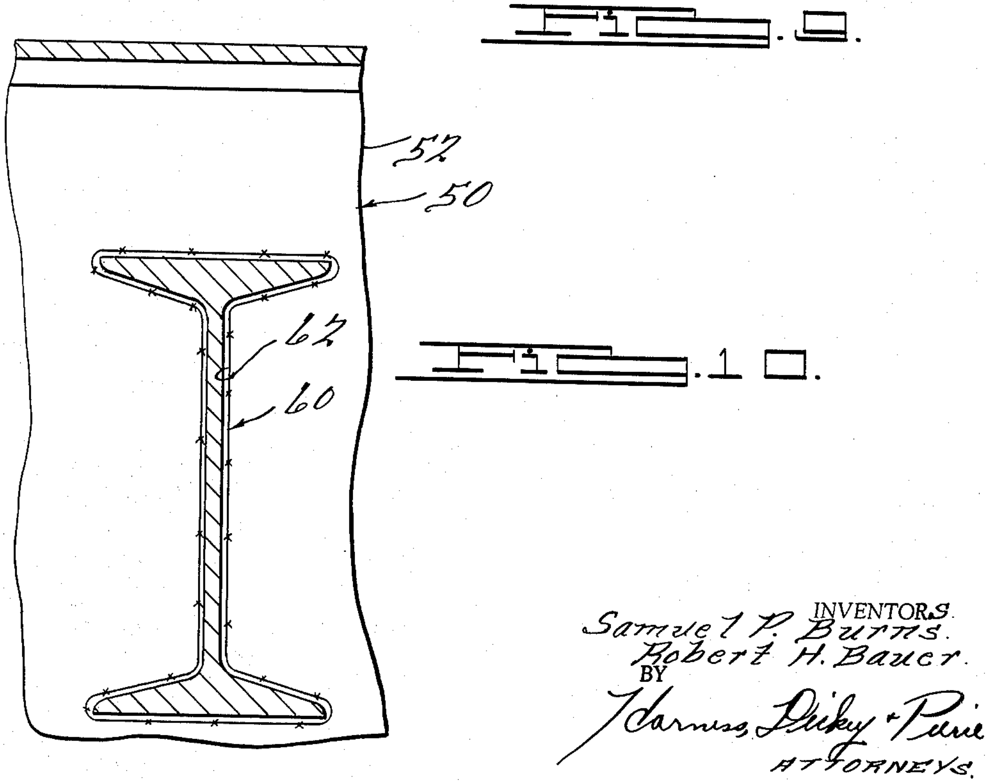
FIGURE 10 is a cross sectional view taken substantially along the line 10—10 of FIGURE 9.

As best seen in FIGURES 6 and 7 of the drawings, a pair of end sills 90 and 92 are each provided with apertures one of which is shown and designated by the numeral 94 for the acceptance of a standard draft gear assembly, 96 (FIG. 1) for example, an A. O. Smith hydraulic draft gear. Standard couplers, release controls, and other coupling equipment as needed are provided.

Figure 11:
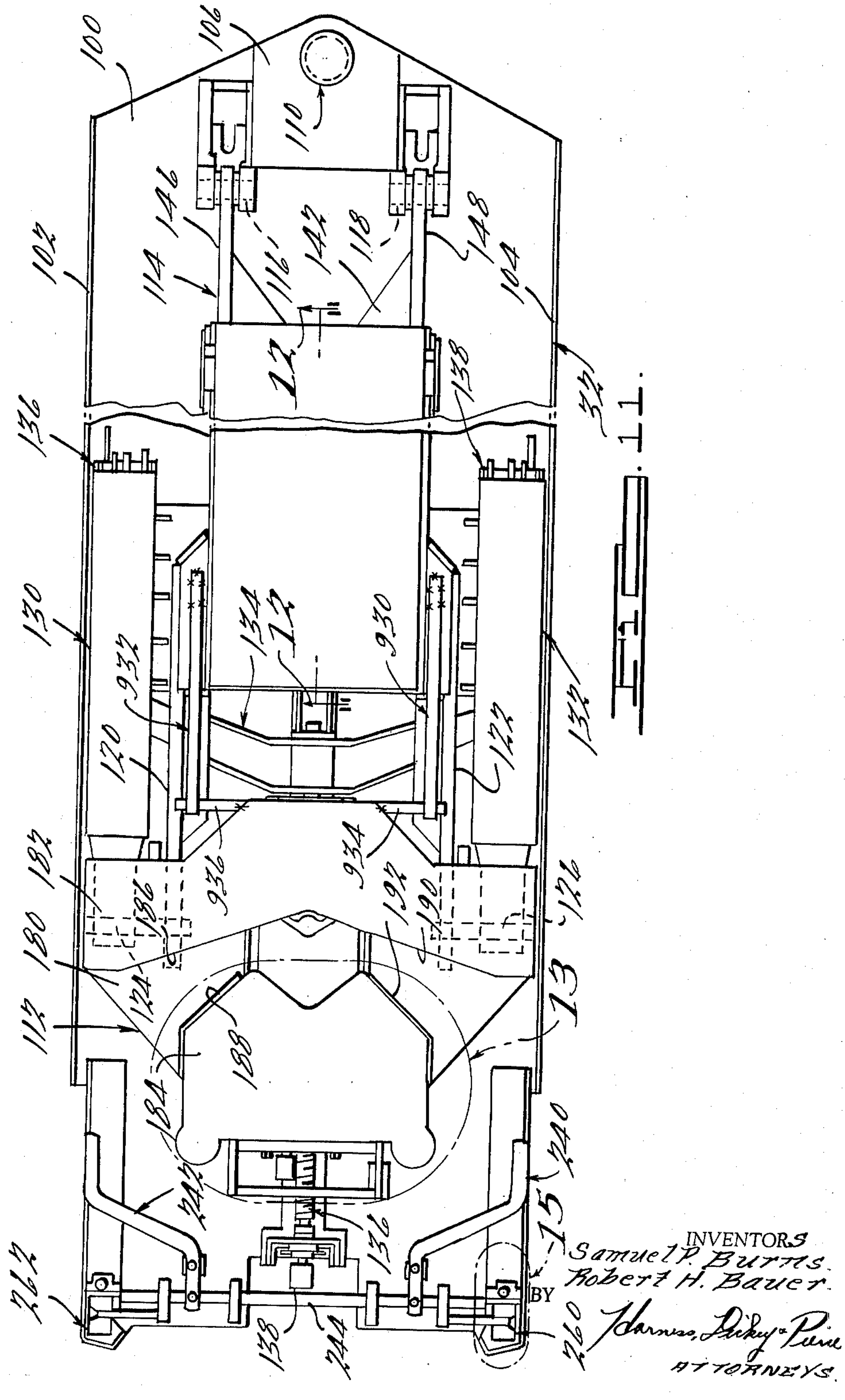
FIGURE 11 is a view taken substantially in the direction of the arrow 11 of FIGURE 4.

As best seen in FIGURE 11, in accordance with one feature of the instant invention, the hitch 32 comprises a generally flat plate 100 having upwardly folded edge portions 102 and 104. The hitch 32 is pinned at one end 106 thereof to a hitch positioning mechanism, to be described, as by a relatively substantial vertically extending pin 110. The hitch 32 comprises essentially a screw-operated mechanism that effects elevation of an upper coupler assembly 112.

The elevating mechanism comprises a strut leg 114 that is pivotally secured to the plate 100 as by a pair of pins 116 and 118. The other end of the strut leg 114 is pivotally secured to the upper coupler 112 through extensions 120 and 122 as by a pair of pins 124 and 126 that are fixedly secured to the upper coupler 112.

A pair of outer support legs 130 and 132 are pivotally coupled to the upper coupler 112 by the pins 124 and 126, as well as to an elevating yoke 134 as by pins 136 and 138. As best seen in FIGURES 25 and 26, the elevating yoke 134 is movable longitudinally of the plate 100 of the hitch 32 under the influence of a nut 135 on the yoke 134 that is engaged with a screw 136 having a socket 138 thereon for the acceptance of the output shaft of a conventional electric torque wrench (not shown). As the yoke 134 is drawn to the left, as seen in FIGURE 25 of the drawings, the pins 136 and 138 are also moved to the left thereby erecting a triangle defined by the legs 130 and 132, the strut leg 114, and the base plate 100 of the hitch 32. The upper coupler 112 is supported at the upper apex of the triangle defined by the legs 130, 132 and strut leg 114 in the erected condition.

Figure 12:
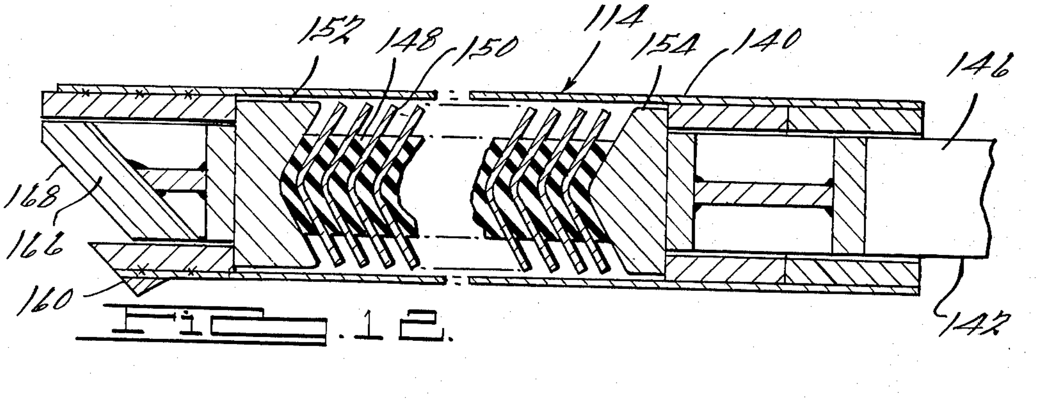
FIGURE 12 is a view taken substantially along the line 12—12 of FIGURE 11.

As best seen in FIGURES 12 and 26 of the drawings, the strut leg 114 comprises a box-like outer frame 140 into which an inner strut leg frame 142 is telescoped. The leg portions 146 and 148 (FIG. 11) on the inner frame 142 are pivotally coupled to the base plate 100 by the pins 116 and 118. Relative movement between the outer frame 140 and inner frame 142 of the strut leg 114 is accommodated by a plurality of rubber pads 148 and metal plates 150, both of which are of chevron-shaped vertical cross section. The rubber blocks 148 and plates 150 abut complementary end castings 152 and 154 which in turn engage load transfer plates 154 and 156 at opposite ends of the outer frame 140. Therefore, longitudinal forces acting on the upper coupler 112 are transferred to the outer frame portion 140 of the strut leg 114 through the extensions 120 and 122 thereof, thence to the end casting 152 to rubber pads 148 and plates 150. The pads 148 are compressed, reaction forces being taken by the end casting 154, inner frame 142, pins 116 and 118 and plates 100.

As seen in FIGURES 12 and 26, the outer frame 140 of the strut leg 114 has a cam plate 160 secured to a forward end thereof, as by welding, which cooperates with a complementary cam surface 162 on a movable cam member 164 to effect initial elevation of the strut leg 114. The cam member 164 is movable longitudinally of the base plate 100 under the influence of the lead screw 136. A forward end portion 166 of the outer frame 140 has a relieved portion 168 to preclude interference with the cam surface 162.

As best seen in FIGURES 25 and 26, the lead screw 136 is connected to the plate 100 through a lost motion connection comprising a longitudinally slidable plate 170 that supports a vertically extending reaction flange 172 through which the screw 136 is journaled. The plate 170 is guided for longitudinal movement by a plurality of guide members 174, 175, 176, 177, 178 and 179. Thus, initial rotation of the screw 136 relative to the nut 135 on the yoke 134 effects advancement of the screw 136, plate 170 and cam member 164 which is mounted thereon to the right as seen in FIGURE 26. When the cam surface 162 effects engagement with the cam 160 on the strut leg 114, the strut leg is elevated. After engagement of the flange 172 with the guide plate 176, the nut 135, yoke 134 and pins 136 and 138 thereon move to the left as seen in FIGURES 25 and 26. Movement of the pins 136 and 138 to the left effects movement of the lower end portions of the legs 130 and 132 to the left effecting erection of the aforementioned triangle comprising the legs 130 and 132, the strut leg 114, and the base plate 100.

Figure 13:
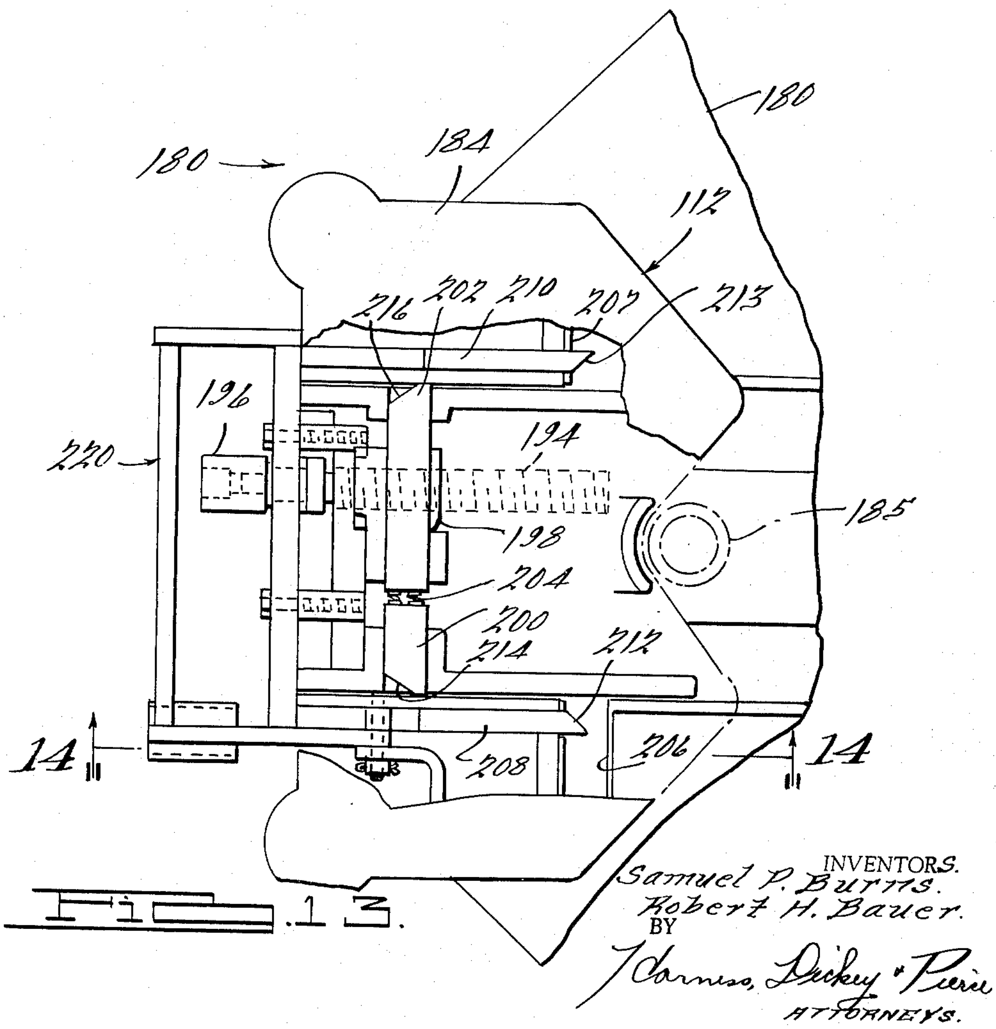
FIGURE 13 is an enlarged fragmentary view, partially broken away, of the area within the circle 13 of FIGURE 11.

As best seen in FIGURES 11 and 13, the upper coupler 112 comprises a support plate 180 having a fixed jaw 182 and a movable jaw 184. The movable jaw 184 is supported for movement toward and away from the fixed jaw 182 for the locking acceptance of a kingpin 185 of either a trailer in the piggyback configuration of a Flexi-Van container when the hitch 32 is rigged in the Flexi-Van condition. It is to be noted that the fixed and movable jaws 182 and 184 have complementary convergent surfaces 186, 188, 190 and 192 to guide the kingpin 185 therebetween.

As best seen in FIGURE 13, the movable jaw 184 is controlled by a lead screw 194 that is journaled on the plate 180 and has a socket 196 at one end thereof for the acceptance of a conventional power-driven torque tool. The lead screw 194 extends through a complementary nut 198 on the movable jaw 184.

The movable jaw 184 is locked in the kingpin retaining condition by a pair of slide locks 200 and 202 that are engageable under the bias of a compressed spring 204, in complementary laterally extending slots 206 and 207 on the plate 180.

In order to effect retraction of the outer jaw 184, the slide locks 200 and 202 are retracted as by a pair of lock retractors 208 and 210 having cam faces 212 and 213 thereon that are engageable with complementary cam faces 214 and 216 on the slide locks 200 and 202 respectively, to effect retraction thereof against the bias of the spring 204.

Figure 14:
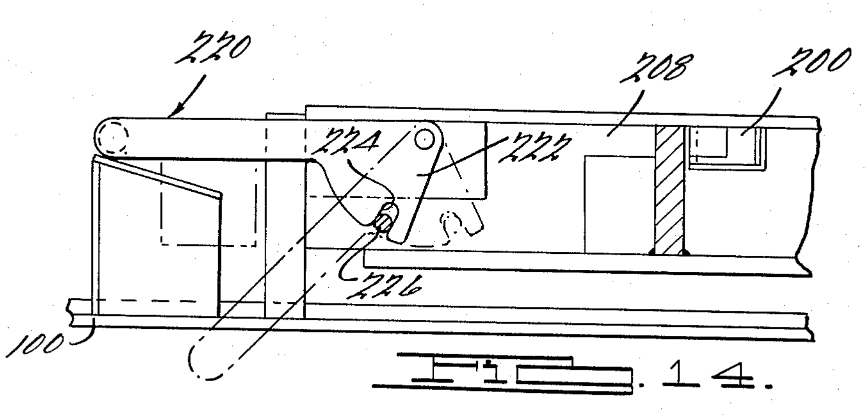
FIGURE 14 is a cross sectional view taken substantially along the line 14—14 of FIGURE 13.

Movement of the slide lock retractors 208 and 210 is effected by a handle mechanism 200 having a pair of bellcranks, one of which is shown in FIGURE 14 and designated by the numeral 222. The bellcrank 222 has a slot 224 therein for the acceptance of a pin 226 on the slide lock retractor 208. Thus, counterclockwise movement of the handle 220 as seen in FIGURE 14 of the drawings, effects movement of the slide lock retractors 208 and 210 to the right thereby effecting retraction of the slide locks 200 and 202 and conditioning the movable jaw 184 for retraction under the influence of the screw 194.

Figures 23, 24, 27, 28:
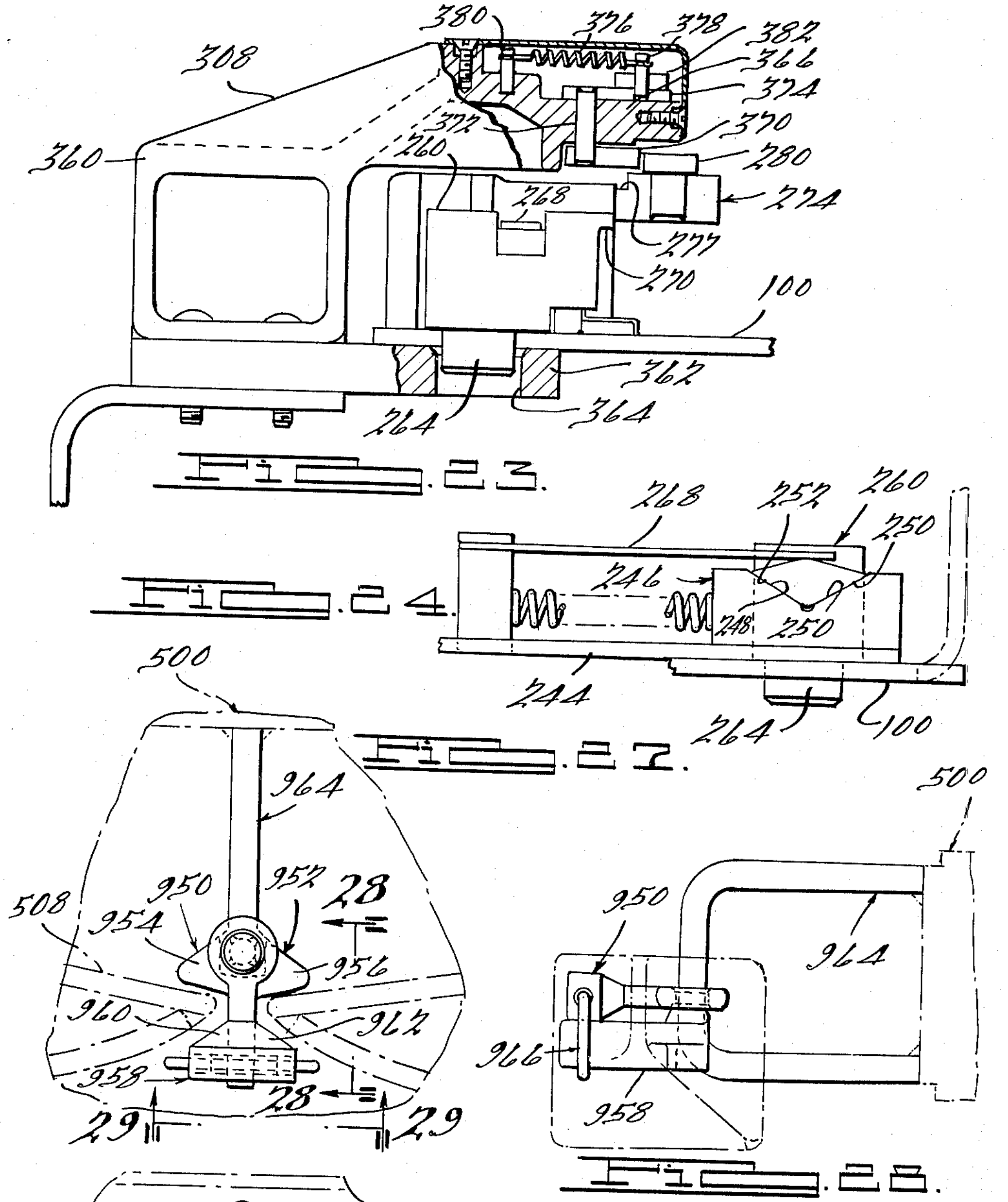
FIGURE 23 is a fragmentary view, partially broken away, of the apparatus within the circle 23 of FIGURE 21.
FIGURE 24 is a view taken substantially along the line 24—24 of FIGURE 15.
FIGURE 27 is an enlarged fragmentary view of the subject matter within the circle 27 of FIGURE 58.
FIGURE 28 is a view taken substantially along the line 28—28 of FIGURE 27.

As best seen in FIGURES 11 and 15–24 of the drawings, the hitch 32 is provided with a novel trigger and pin system for locating the hitch 32 at a desired angularly laterally outwardly extending position relative to the longitudinal axis of the railcar to facilitate reception of the kingpin of a Flexi-Van container. More particularly, as seen in FIGURE 11, a pair of operating handles 240 and 242 are pivotally secured to the plate 100 of the hitch 32 so as to effect reciprocation of a tiebar 244. As best seen in FIGURE 24, the tiebar 244 has a pair of generally V-shaped cam blocks at opposite ends thereof, one of which is shown and designated by the numeral 246. The cam block 246 has a pair of downwardly convergent cam faces 248 and 250 thereon that cooperate with complementary faces 252 and 254 on a pin block 260. It is to be understood that like cam and pin blocks 260 are provided on opposite sides of the hitch 32, only the one cam and pin block being discussed in detail for the purpose of simplicity.

The pin block 260 has a circular pin 264 that is extendable through a complementary circular aperture and through a complementary aperture in a positioning mechanism as will be discussed. The pin block 260 is normally biased downwardly relative to the plate 100 by a cantilevered spring 268.

Movement of the pin block 260 downwardly under the influence of the spring 268 is controlled by a latching shoulder 270 that is engageable over a complementary shoulder 272 on a trigger 274. The trigger 274 is normally biased into latching engagement with the pin block 260 by a pair of helical compression springs 276 and 278. The trigger 274 has a circular triggered cam 280 thereon that is engageable with complementary structure on the hitch positioning mechanism as will be described hereinafter.

As best seen in FIGURES 20–24 of the drawings, a positioning mechanism 300 for the hitch 32 comprises a pair of elongated positioning bars 302 and 304 having a pair of receiver assemblies 306 and 308 at the ends thereof, respectively, and a rear bar 310 at the other end thereof, respectively. The bar 310 supports a tree assembly 312 comprising a pair of generally triangular plates 314 and 316 having aligned apertures 318 and 320 at the apex thereof for the acceptance of the locking pin 110 on the hitch 32.

The positioning mechanism 300 is provided with longitudinally spaced rolls 322, 324, 326 and 328 which align the bars 302 and 304 and receivers 306 and 308 within complementary keyways 330 and 332 (FIG. 17) in the deck 72 of the railcar 20.

Figure 19:
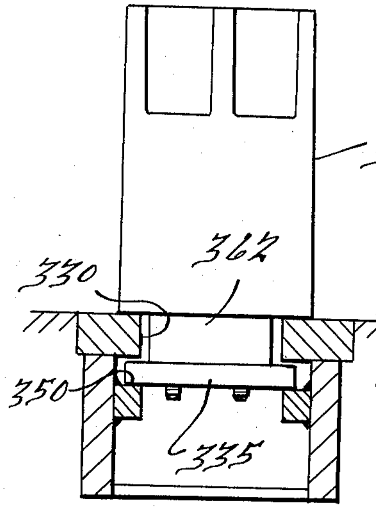
FIGURE 19 is a cross sectional view taken substantially along the line 19—19 of FIGURE 17.

As best seen in FIGURES 19 and 23, a plurality of keys 336, 338, 340, 342, 344 and 346 are also receivable in complementary ways one of which is shown in FIGURE 19 and designated by the numeral 350, within the keyways 330 and 332 to guide the positioning mechanism 300 for movement longitudinally of the railcar 20.

As best seen in FIGURES 22 and 23, the receiver 308, which is similar to the receiver 306, comprise a steel casting 360 having a base plate 362 with an aperture 364 therein complementary to the pin 264 on the pin block 260 for the reception thereof to lock the hitch 32 in a central or stowed condition. The receiver 308 has a gooseneck portion 366 overlying the pin block 260 with a pin lock cam 370 thereon, of novel configuration, that is supported for rotation by a vertical shaft 372. The shaft 372 extends through the gooseneck portion 366 of the receiver 308 for the support of a cam link 374 at the upper end thereof. A helical tension spring 376 extends between the pin 378 on the cam link 374 and a pin 380 on the receiver 308 to lock the pin lock cam 370 at a desired over-center position as will be described. Also, as best seen in FIGURE 20, the pin lock cams 370 are coupled for concomitant movement by a cam link bar 382 that extends between the pins 378 on the cam links 374.

Figures 17, 18:
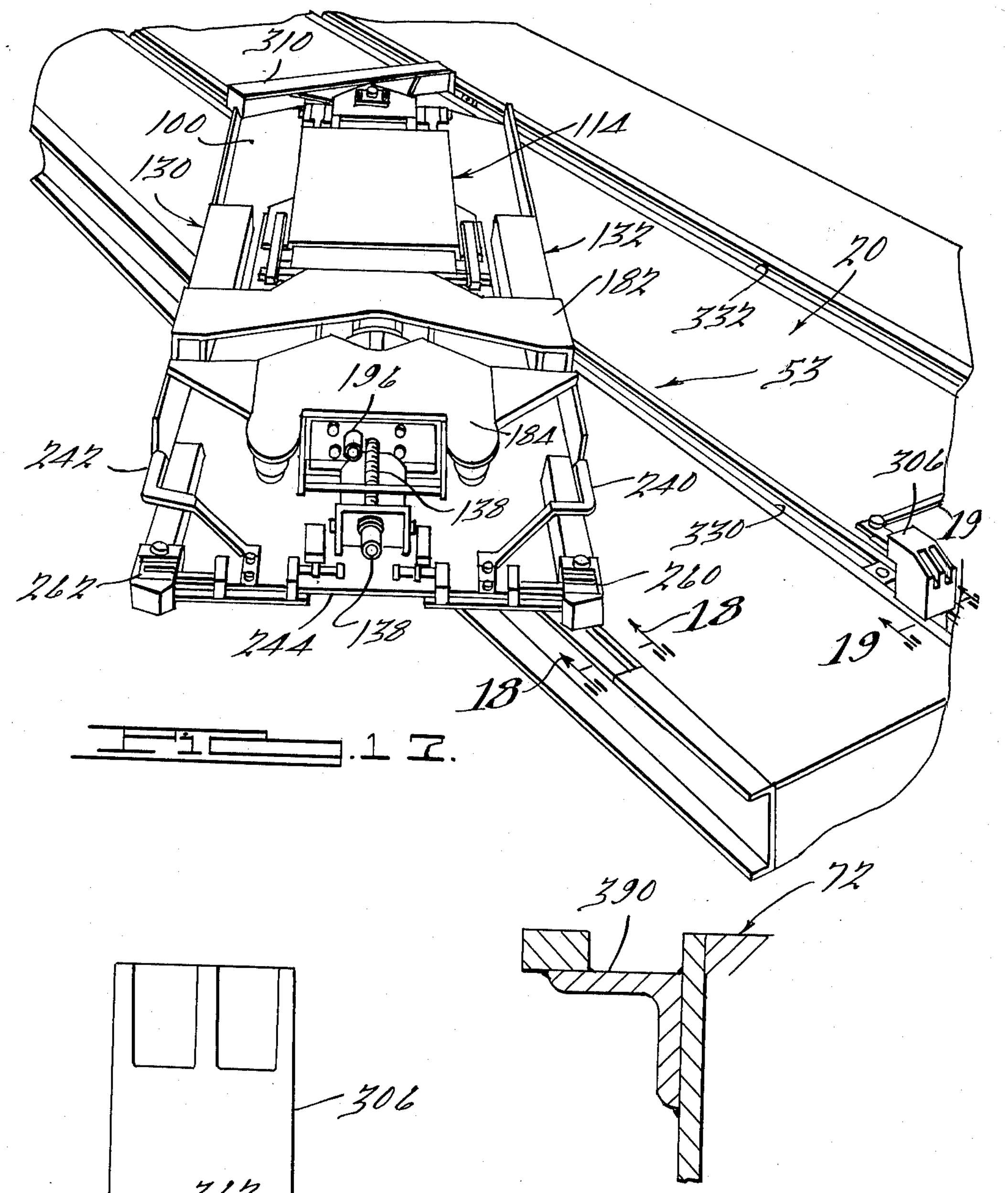
FIGURE 17 is a view similar to FIGURE 4 showing the opposite end of the multi-purpose hitch.
FIGURE 18 is a cross sectional view taken substantially along the line 18—18 of FIGURE 17.

As seen in FIGURE 18 of the drawings, the railcar 20 is provided with a longitudinally extending groove 390 adjacent each of the outboard edges thereof for the acceptance of the pins 264 on the hitch 32 to lock the hitch at a desired angularly outwardly extending position for the acceptance of the kingpin of a Flexi-Van container.

Initially the hitch 32 is positioned centrally of the positioning mechanism 300 (FIGURE 20) with the pins 264 engaged in the complementary apertures 364 in the receivers 306 and 308. Release of the pins 264 from the apertures 364 is effected by pulling on either the handle 240 or the handle 242 thereby effecting movement of the bar 244 and cams 246 at opposite ends thereof. Movement of the cams 246 in either direction effects elevation of the pin blocks 260 and therefore retraction of the pins 264. When the pin blocks 260 are elevated the triggers 274 are movable into engagement therewith under the bias of the springs 276 and 278 (FIGURE 15) thereby to lock the pin blocks 260 in the retracted condition.

Figure 15:
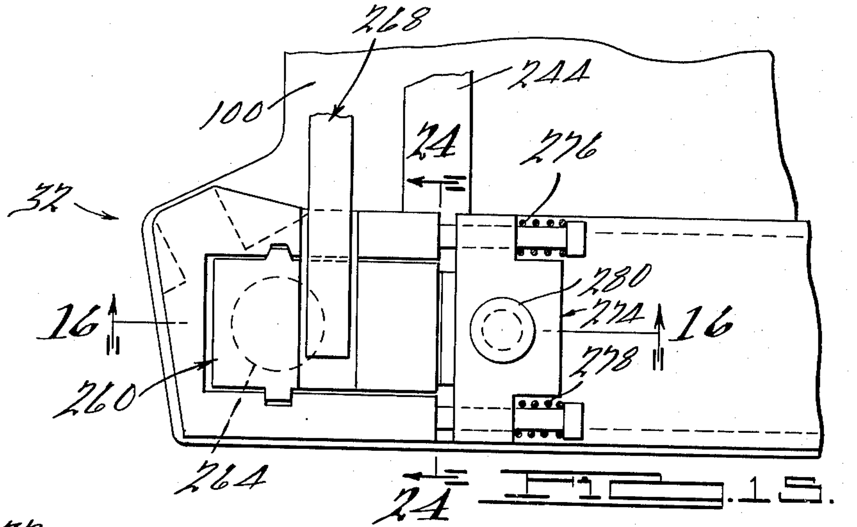
FIGURE 15 is an enlarged fragmentary view taken substantially within the circle 15 of FIGURE 11.
Figure 16:
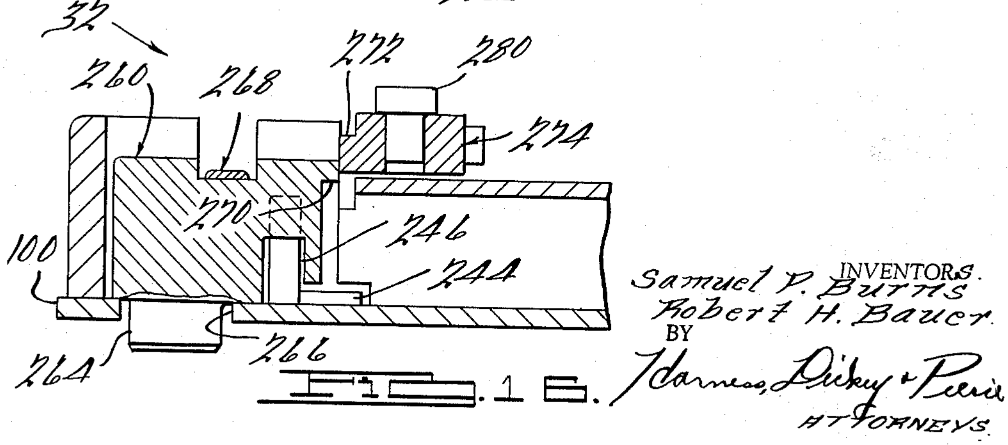
FIGURE 16 is a cross sectional view taken substantially along the line 16—16 of FIGURE 15.

It is to be noted that each of the triggers 274 is provided with a circular cam 280 that is engageable with the pin lock cams 370 on the receivers 306 and 308. As the cams 280 move to the right or left relative to the positioning mechanism 300 the pin lock cams 370 are rotated in the direction of movement of the cams 280 and retained in this position by the springs 272. As the cam 280 on the far side of the hitch 32 relative to the direction of lateral movement thereof moves into engagement with the opposite pin lock cam 370 it is moved to the right as seen in FIGURES 15 and 16 of the drawings thereby releasing the associated pin block 260 for movement under the bias of the spring 268 into the associated groove 390 on the side of the railcar 20. In this manner the hitch 32 is positively positioned for the acceptance of the kingpin of a Flexi-Van container. After coupling with the Flexi-Van container the pins 264 are retracted in the manner discussed hereinbefore whereupon the container and hitch 32 are swingable into alignment with the central longitudinal axis of the railcar 20.

As best seen in FIGURES 30–40 of the drawings, the turntable 36 comprises a generally rectangular platform or outer frame 500 having a central aperture 502 of generally diamond-shaped configuration, the points of which are truncated. An inner frame 504, has a configuration complementary to and relatively smaller than the aperture 502 so as to be acceptable therein. The inner frame 504 is pivotally attached to the railcar 20. The outer frame 500 and its associated inner frame 504 will be more particularly discussed hereinafter.

A pair of generally inverted U-shaped channels 506 and 507 are secured to opposite ends of the turntable outer frame 500. The channels 506 and 507 are of like construction except for right and left hand configuration. Therefore, only the channel 506 and its associated appendages will be described for the purpose of brevity.

The channel 506 is provided with a ramp portion 508 and a Flexi-Van positioning arm 510 at opposite ends thereof. The arm 508 effects vertical movement of a container onto the channels 506, the arm 510 effecting engagement of a plurality of locking pins with the container when it moves to predetermined position relative to the turntable 36, as will be described.

The arm 508 is pivotally secured to the channel 506 by an upper pin 512. A lower support arm 514 extends between a removable lower pin 516 on the channel 506 and a pin 518 on the arm 508. A strut arm 520 extends between a removable pin 522 on the arm 508 and a pin 524 on the turntable frame 500. The arm 508 is foldable relative to the channel 506, as will be described.

Figures 33, 34, 35, 36:
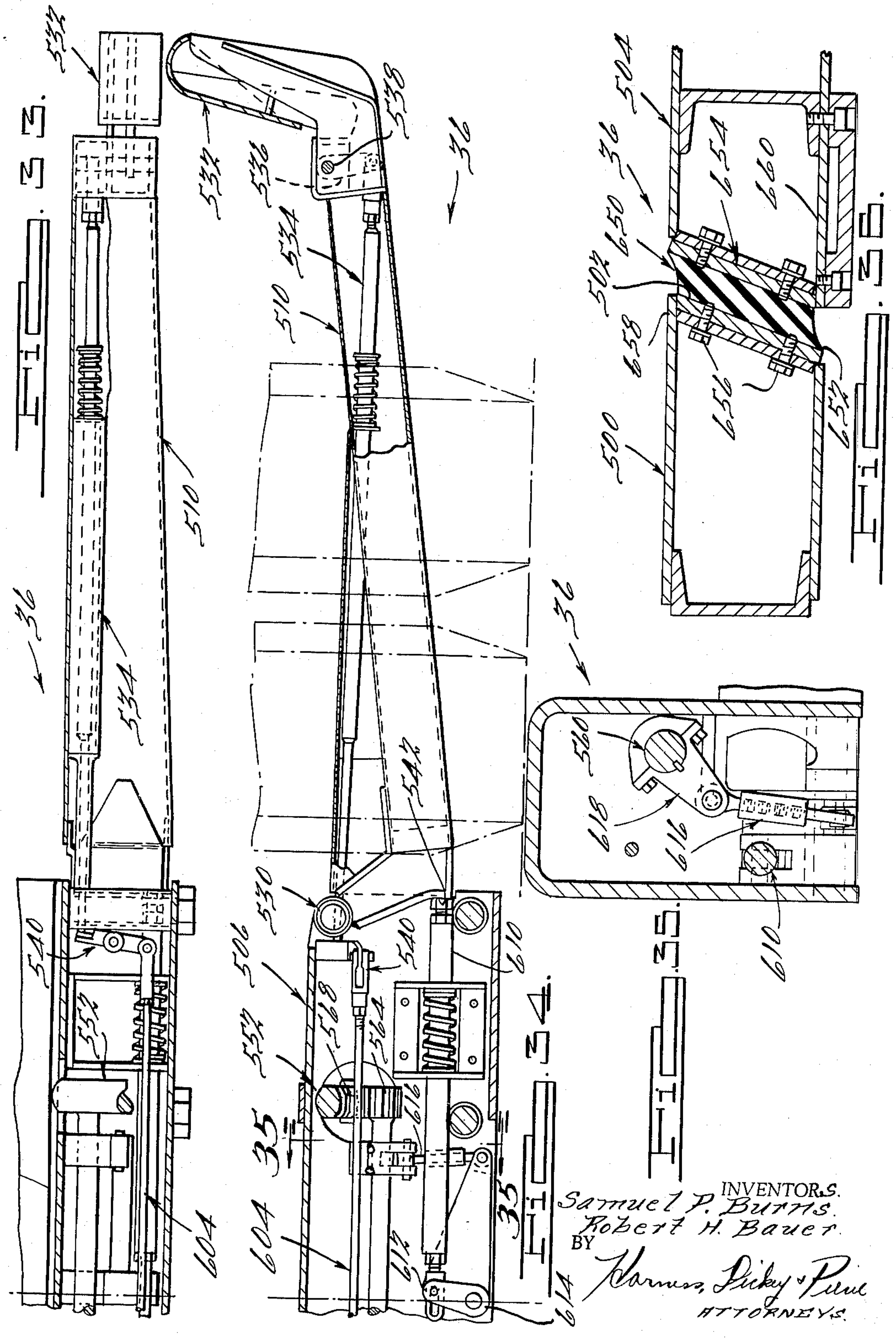
FIGURE 33 is a top plan view, partially in section, similar to FIGURE 30 and a continuation thereof.
FIGURE 34 is a side elevational view, partially in section, similar to FIGURE 31 and a continuation thereof.
FIGURE 35 is a cross sectional view taken substantially along the line 35—35 of FIGURE 34.
FIGURE 36 is a cross sectional view taken substantially along the line 36—36 of FIGURE 32.

The container positioning arm 510 is pivotally secured to the channel 506 by a pin 530. The arm 510 has a container engaging shoe 532 at the outboard end thereof which is connected to an actuator rod 534 through a bell crank 536, the bell crank 536 being pivoted on a pin 538 on the arm 510. Clockwise rotation of the shoe 532 about the pin 538 thus effects movement of the push rod 534 to the left as seen in FIGURE 34 of the drawings, thereby effecting counterclockwise rotation of a link 540 in the channel 506 (FIGURE 33). It is to be noted that the arm 510 has a pressure pad 542 at the inner end thereof underlying the pivot pin 530, the function of which will be described hereinafter.

Figure 37:
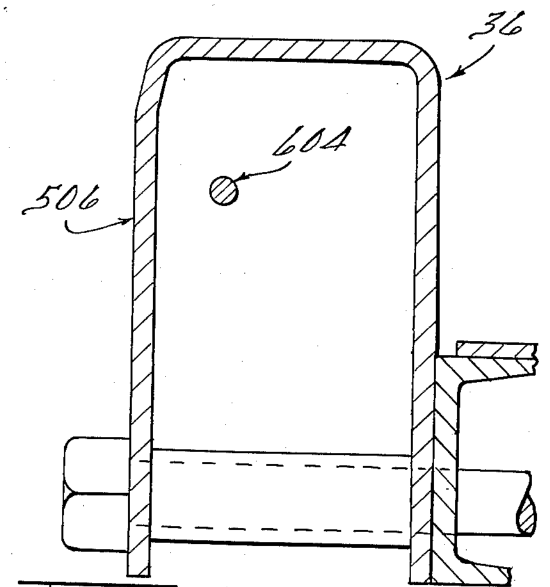
FIGURE 37 is a cross sectional view taken substantially along the line 37—37 of FIGURE 31.

A pair of container locking pins 550 and 552 are extendable laterally of the channel 506 for engagement within complementary apertures 554 in the seating rails 556 of the Flexi-Van container 40 (FIG. 37). The pins 550 and 552 effect locking of the container 40 on the turntable 36 for rail shipment.

Figures 39, 40:
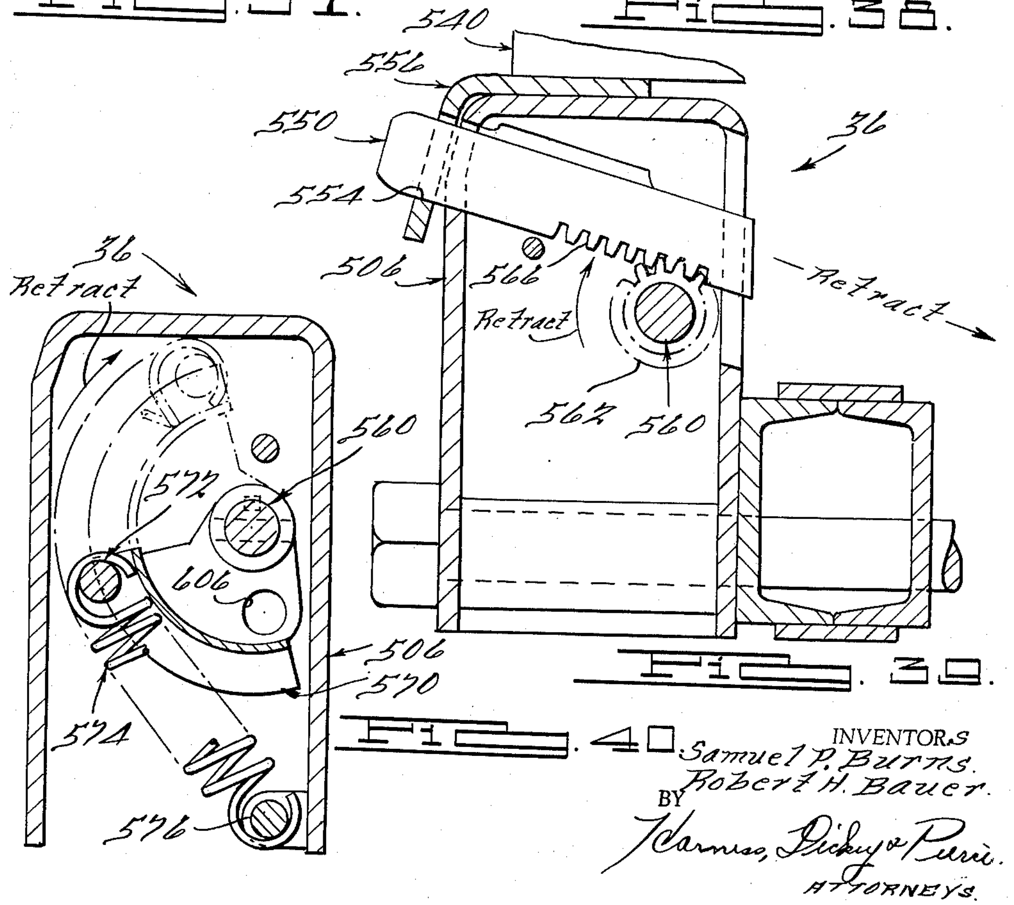
FIGURE 39 is a cross sectional view taken substantially along the line 39—39 of FIGURE 31.
FIGURE 40 is a cross sectional view taken substantially along the line 40—40 of FIGURE 31.

Movement of the locking pins 550 and 552 between a retracted or cocked position and an outwardly extending container-engaging position is under the control of a locking pin gear shaft 560. The shaft 560 extends longitudinally within the channel member 506 having a pair of helical gears 562 and 564 thereon that are engageable with complementary racks 566 and 568 on the pins 550 and 552, respectively. As seen in FIG. 39, clockwise rotation of the shaft 560 effects retraction of pins 550 and 552, counterclockwise rotation of the shaft 560 effecting advancement thereof into engagement in the complementary apertures 554 in the seating rail 556 of the container 558.

As best seen in FIGURE 40 of the drawings, the shaft 560 has a sheave 570 at one end thereof for the support of a spring pin 572. A spring 574 extends between the pin 572 and a similar pin 576 on the channel 506 thereby to normally effect a counterclockwise bias on the shaft 560. In other words, the shaft 560 is normally biased so as to effect advancement of the pins 550 and 552 outwardly of the channel 506 to a locking condition relative to the seating rail 556 on the container 40.

Figure 38:
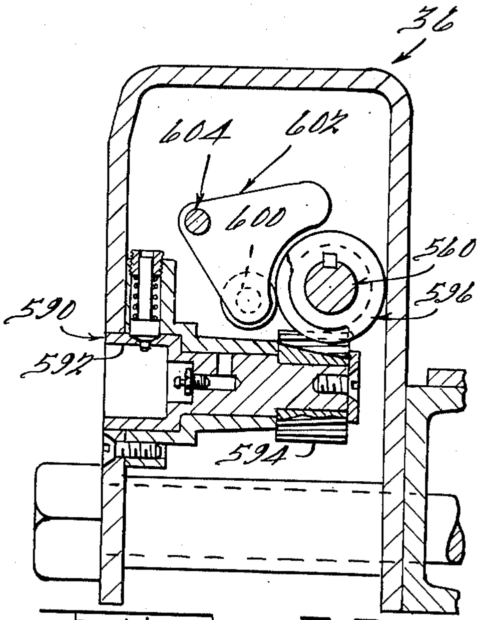
FIGURE 38 is a cross sectional view taken substantially along the line 38—38 of FIGURE 31.

As best seen in FIGURE 38 of the drawings, rotation of the shaft 560 to effect retraction of the pins 550 and 552 and cocking thereof for advancement under the bias of the spring 574 is effected by a crank shaft 590 having a socket 592 therein for the acceptance of a conventional crank (not shown). The shaft 590 has a helical gear 594 at the inner end thereof that is meshed with a complementary helical gear 596 on the locking pin shaft 560. Thus, rotation of the crankshaft 590 as by a hand crank effects retracting of the pins 550 and 552 and loading of the spring 574 to cock the pins 550 and 552.

The pins 550 and 552 are retained in the cocked position by a cocking pin 600 that is supported on a cocking pin plate 602. The plate 602 is secured to a reciprocable release shaft 604 which is in turn coupled to the link 540 at the opposite end of the channel 506. The pin 600 is normally biased to the lock condition within an aperture 605 in the sheave 570 so that when the shaft 560 and sheave 570 are rotated to the cocked position the pin 600 engages in the aperture 606 in the sheave 570 to lock the pins 550 and 552 in the cocked position.

From the foregoing description, it should be apparent that engagement of the container 40 with the shoe 532 on the arm 510 effects a push on the rod 534 through the bell crank 536 which in turn effects a pull on the rod 204 which retracts the pin 600 from within the aperture 204 in the sheave 570 whereupon the sheave 570 and shaft 560 are conditioned for counterclockwise rotation under the bias of the spring 574. Counterclockwise rotation of the shaft 560 effects outward movement of the pins 550 and 552 to the locked condition within the apertures 554 in the lower rail 556 of the container 558.

It is desirable in field use that engagement between the pins 550 and 552 and the rail 556 on the container 40 be made when the container is moving forwardly relative to the turntable 36 since rearward movement is under the bias of the tractor and therefore the inertia forces are relatively high. Thus, in accordance with one feature of the instant invention the arm 510 is depressible or rotatable clockwise about its support pin 530 due to continued rearward movement of the container 40 subsequent to its engagement with the shoe 532. It will be recalled that engagement of the container with the shoe 532 effected release of the pin shaft 560 and conditioning the pins 550 and 552 for outward movement under the bias of the spring 574. However, clockwise rotation of the arm 510 and the pressure pad 542 thereon which underlies the pin 530, effects a push on a rod 610 which effects counterclockwise movement of a bell crank 612 (FIG. 34). The bell crank 612 is supported on a pin 614 in the channel 506, counterclockwise rotation thereof effecting an upward push on a link member 616 and 618 and clockwise rotation of the pin control shaft 560 (FIG. 35). After rearward movement of the container 40 ceases and it is moved forwardly by a tractor, the arm 510 is ultimately freed for counterclockwise rotation.

The space relationship between the shoe 532, the end of the container 40, the pins 550 and 552, and the apertures 554 in the container rail 556 is such that the pins 550 and 552 are again released for movement outwardly to the locked condition when the apertures 554 are approaching the pins 550 and 552 as the container moves forwardly. Thus, overtravel of the container 40 due to large inertia forces is accommodated with subsequent locking of the pins 550 and 552 in the proper apertures 564 to the space relationship of the aforementioned components.

Figures 30, 31, 32:
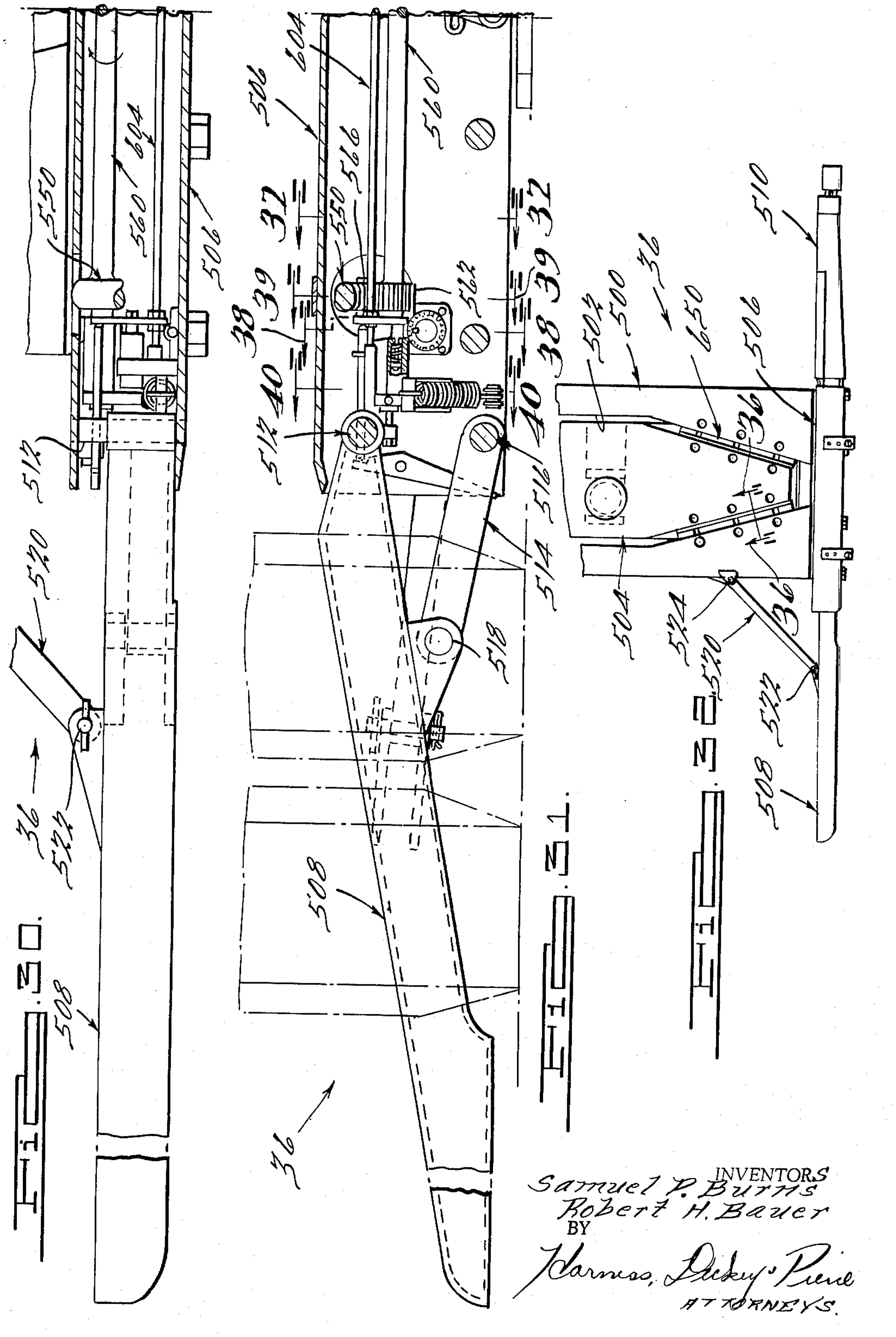
FIGURE 30 is a top plan view, partially in section, of a portion of the turntable.
FIGURE 31 is a side elevational view of the subject matter of FIGURE 30.
FIGURE 32 is a top plan view of the turntable showing the orientation of the structural elements thereof.

As best seen in FIGURE 32 of the drawings, the outer frame portion 500 of the turntable 36 is secured to the center portion 504 thereof by a plurality of rubber shear blocks 650 which are secured, as by bonding, to spaced parallel plates 652 and 654. The plates 652 and 654 are secured to the turntable members 500 and 504, respectively, as by bolts 656. It is to be noted that an upper plate 658 of the outer frame 500 overlies the plate 652 and that a lower plate 660 on the center portion 504 underlies the plate 564. Therefore, the load of the container 40 is supported by the outer frame 500, thence transfer to the plate 652 in compression which in turn transfers the load to the rubber element 650 in shear. The load on the element 650 is in turn transferred to the inner plate 654 in shear which in turn transfers the load to the plate 660 on the center section 504 in compression. The foregoing arrangement has been found to maximize the load handling capabilities of the turntable 36. It is also to be noted that the truncated diamond-shaped configuration of the center section 504 and aperture 502 in the frame 500 is such that maximum secondary shock absorption is achieved commensurate with maximized load carrying ability of the turntable 36.

Figure 58:
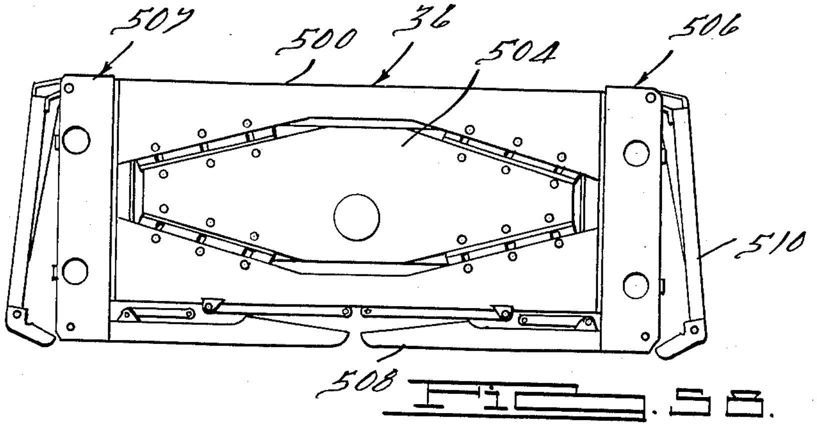
FIGURE 58 is a top plan view of the turntable in the collapsed condition.

The turntable is conditioned for storage so as to permit the railcar 20 to carry piggyback trailers by first unbolting the channels 506 from the outer frame 500 of the turntable and then rotating the channels and appended structure 90° onto the deck of the railcar 20. The forward or accepting arm 508 on each of the channels 506 is then rotated towards the outer frame 500 and the rearward or positioning mechanism leg 510 is rotated away from the outer frame 500, as shown in FIGURE 58 of the drawings. The central longitudinal axis of the turntable is aligned with the central longitudinal axis of the railcar thereby to permit the wheels of a piggyback trailer to pass on opposite sides of the turntable.

Figures 41, 42:
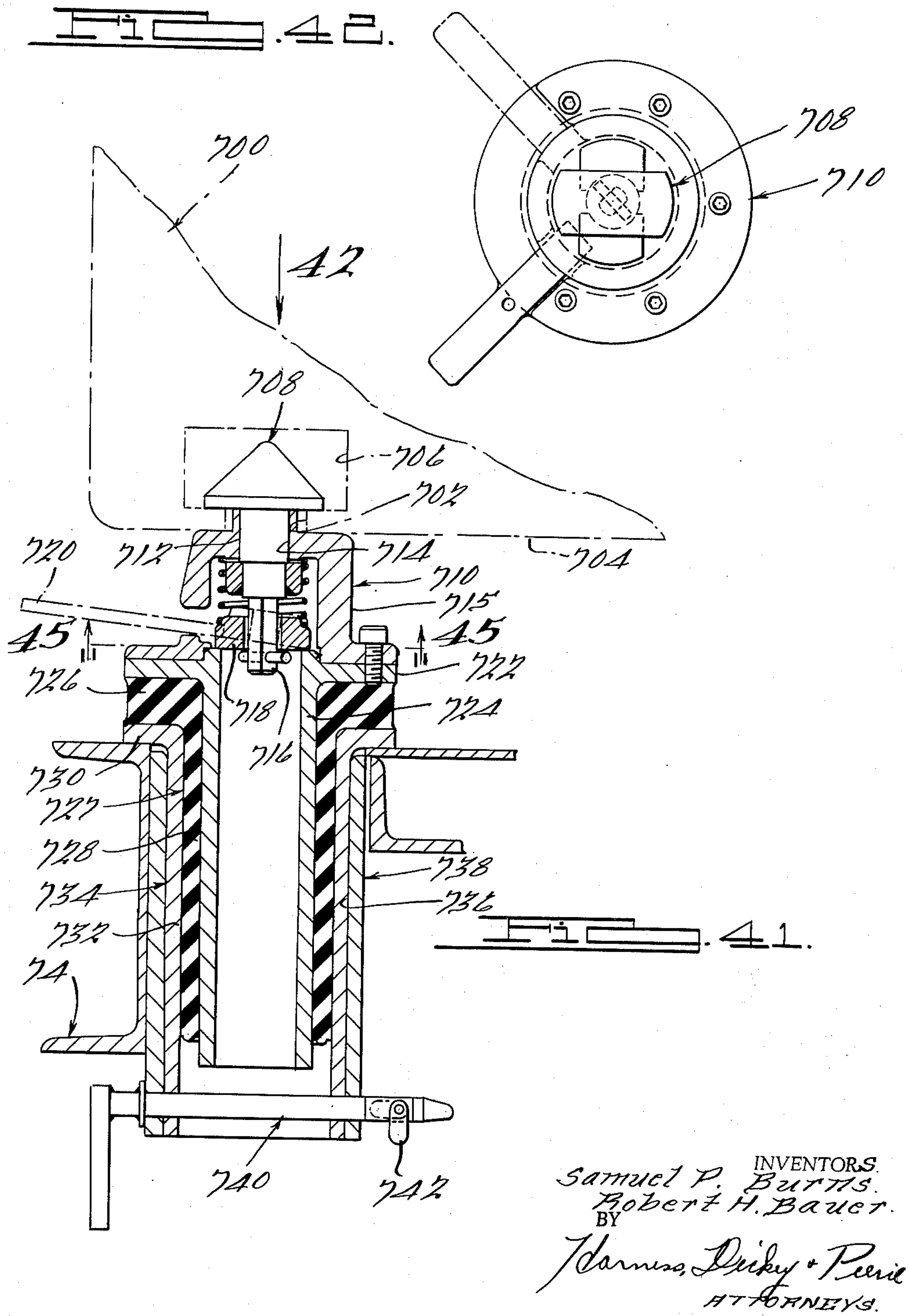
FIGURE 41 is a cross sectional view of a container coupler shown in operative association with a lift on-lift off container.
FIGURE 42 is a view taken in the direction of the arrow 42 of FIGURE 41.

As best seen in FIGURE 41 of the drawings, a lift on-lift off container 700 is provided with an aperture 702 on a bottom face 704 thereof leading into an enlarged recess 706 for the acceptance of a generally pyramid-shaped twist lock 708 on a lift on-lift off container coupler 710. The pyramid head 708 of the coupler 710 is mounted for rotation on a shaft 712 that extends through a complementary bore 714 in a head casting 715 of the coupler 710. A lower end portion 716 of the shaft 712 is of square cross section so as to be drivably engaged with a collar 718. The collar 718 is rotated by an outwardly extending handle 720 thereby to rotate the pyramid head 708.

The coupler head casting 715 is seated on a flange 722 of an upper coupler member 724 which in turn is seated on an annular rubber pad 726. A tubular portion 724 of the upper coupler member is surrounded by a cylindrical rubber portion 728. Thus, the rubber pad 726 and cylinder 728 define a secondary shock absorber. The cylindrical portion 728 and annular portion 726 of the rubber shock absorber 727 are seated on a cylindrical portion 732 and radial flange 730 of a shock absorber seat 734, respectively. The seat 734 is removably accepted in a complementary cylindrical aperture 736 in a cylinder 738. The coupler 710 is retained within the cylinder 738 by a transversely extending pin 740 having a detent member 742 at one end thereof to preclude inadvertent retraction.

As best seen in FIGURE 42, the head portion 708 of the coupler 710 is rotated to a position generally longitudinally of the railcar 20 for the acceptance of the container 700 whereupon it is rotated 90° to the solid line position shown to effect locking of the container 700 on the railcar 20.

Figure 44:
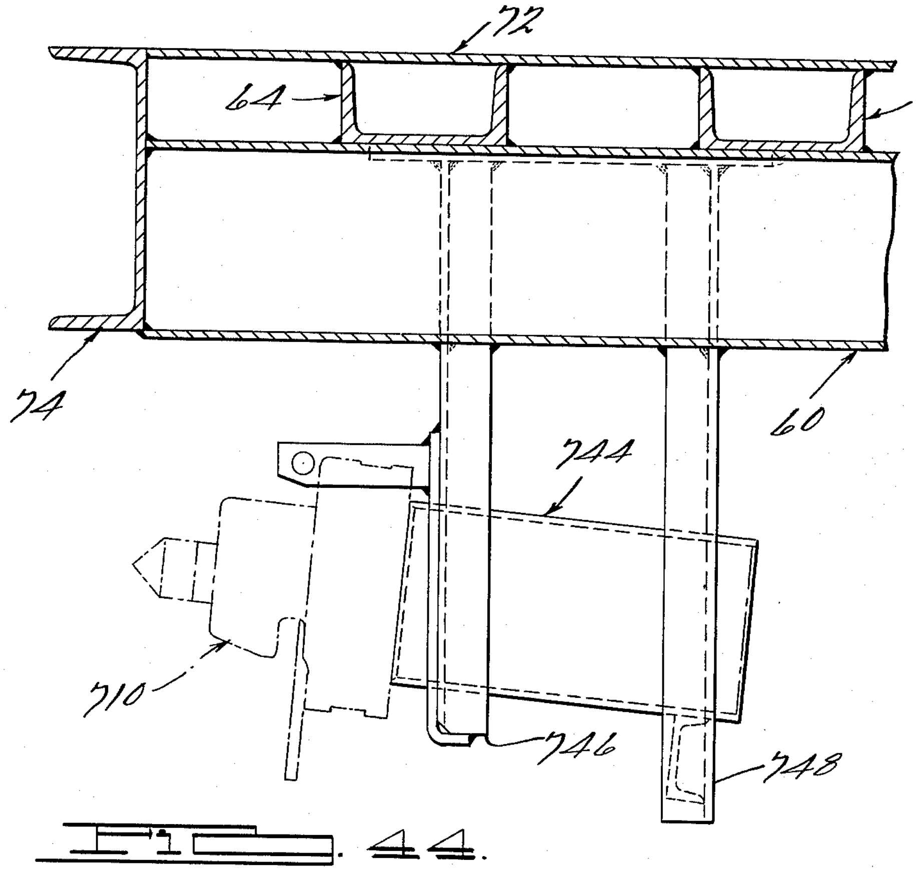
FIGURE 44 is a cross sectional view taken substantially along the line 44—44 of FIGURE 6.
Figure 43:
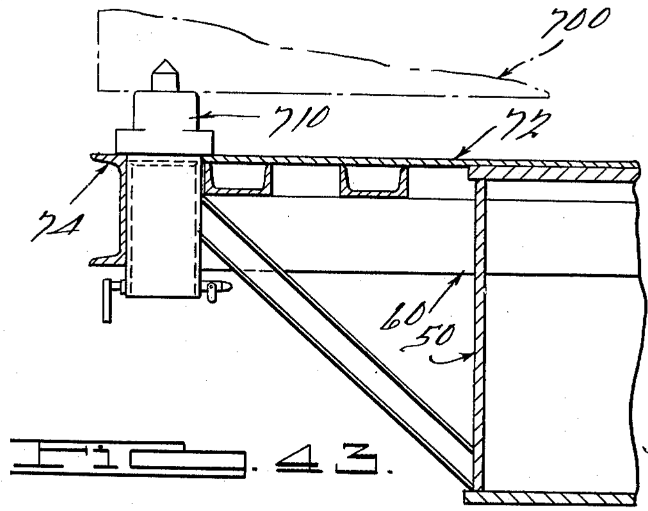
FIGURE 43 is a view, similar to FIGURE 41, showing the orientation of the container coupler to the railcar deck.

As best seen in FIGURE 44, provision is made for storage of the coupler 710 in a generally horizontally extending tubular member 744 suspended by a pair of brackets 746 and 748 from the transverse members of the railcar 20.

Figures 45, 46:
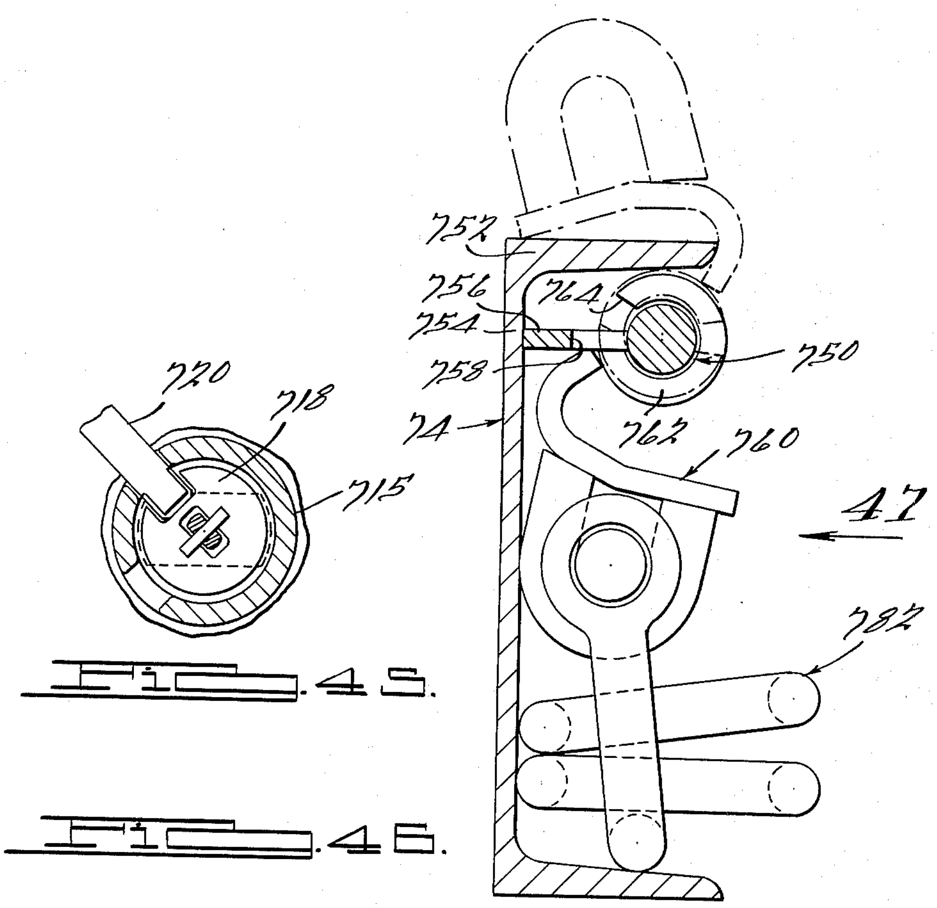
FIGURE 45 is a cross sectional view taken substantially along the line 45—45 of FIGURE 41.
FIGURE 46 is a cross sectional view taken substantially along the line 46—46 of FIGURE 6.

As best seen in FIGURE 46 of the drawings, an improved chain rail 750 is secured to the rail 74 immediately underlying an upper flange 752 thereon. The chain rail 750 is spaced from a vertical flange portion 754 of the rail 74 by a horizontal plate 756 having a plurality of apertures 758 therein that position and index a rotatable chain lock 760. The chain lock 760 has a circular portion 762 with an aperture 764 therein so as to be slidable longitudinally of the rail 750. When the chain lock 760 is positioned at a desired position longitudinally of the rail 750, it is rotated counterclockwise as seen in FIGURE 46 to the dotted line position. The loop portion 762 thereof passes through a desired aperture 758 in the horizontal plate 756. When rotated to the dotted line position further longitudinal movement of the lock 760 is precluded. It is to be noted that when in the operative condition the load on the lock 760 is transferred directly to the flange 752 of the rail 74 substantially relieving the rail 750 of chain loads.

Figure 47:
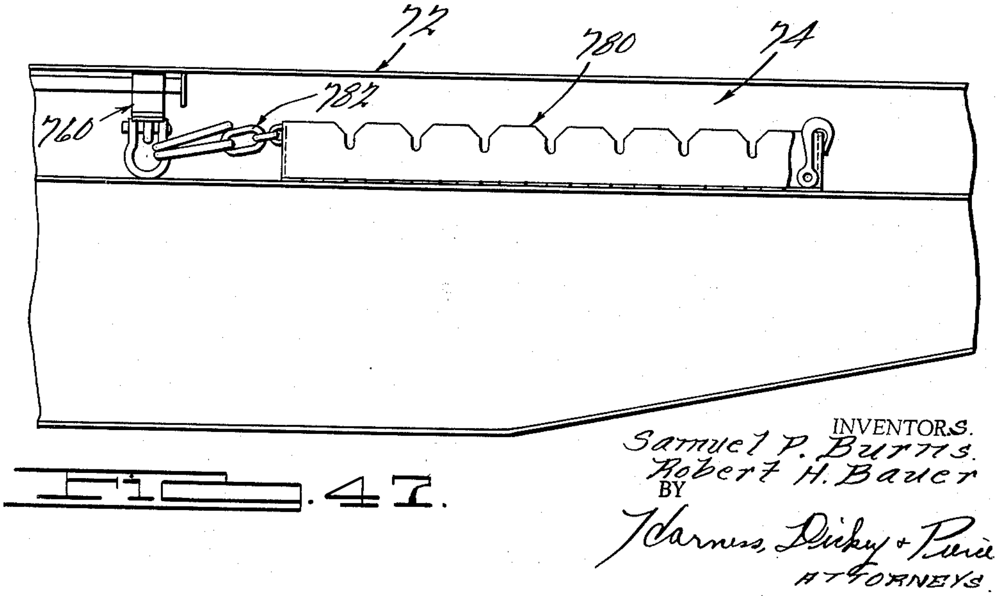
FIGURE 47 is a view taken in the direction of the arrow 47 of FIGURE 46.
Figure 48:
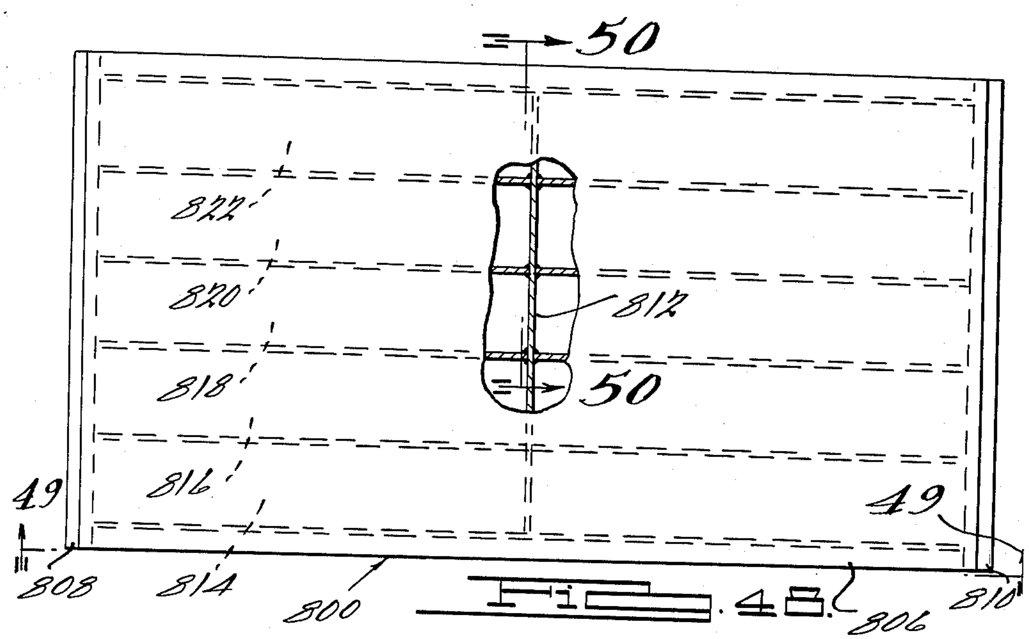
FIGURE 48 is a view taken in the direction of the arrow 48 of FIGURE 1.
Figure 49:
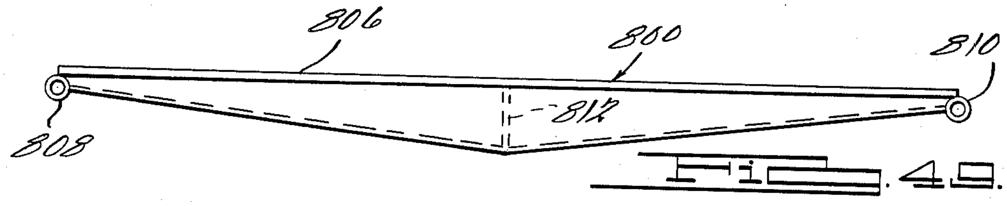
FIGURE 49 is a cross sectional view taken substantially along the line 49—49 of FIGURE 48.

As seen in FIGURE 47 of the drawings, a chain locker 780 is provided along the side rail 74 for storage of a chain 782.

As best seen in FIGURES 48 to 52 of the drawings, the railcar 20 is provided with a relatively long bridge plate 800 on one side thereof, a relatively short bridge plate 802 being provided at the outer side thereof. The bridge plates 800 and 802 are pivotally supported on a common bar or shaft 804 which serves as a torsion counterbalance for the large bridge plate 800.

Figure 50:
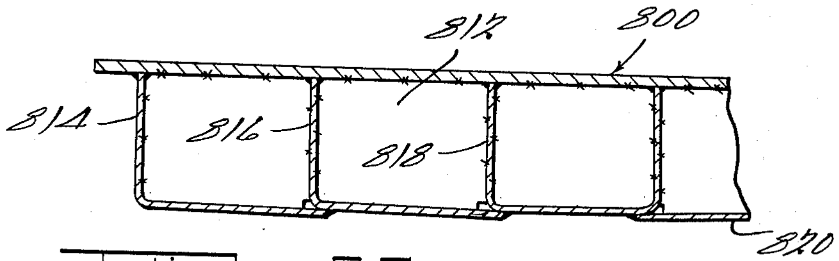
FIGURE 50 is a cross sectional view taken substantially along the line 50—50 of FIGURE 48.

The large bridge plate 800 comprises a generally flat top plate 806 having a pair of transversely extending tubular members 808 and 810 at opposite ends thereof. A center reinforcement plate 812 extends laterally of the plate 806, a plurality of nested bottom sections 814, 816, 818, 820 and 822 being secured thereto and to the tubular members 808 and 810 as by welding. As best seen in FIGURE 50, the members 814, 816, 820 and 822 are of generally L-shaped transverse cross section and the center section 818 of V-shaped cross section. The vertical legs of the members 814, 816, 818, 820 and 822 are secured to the top plate 800 as by welding, the horizontal legs thereof underlying an adjacent member in nested or lapped relationship and secured thereto as by welding. The vertical legs of the members 814, 816, 818, 820 and 822 are notched for the acceptance of the transverse plate member 812.

Figure 51:
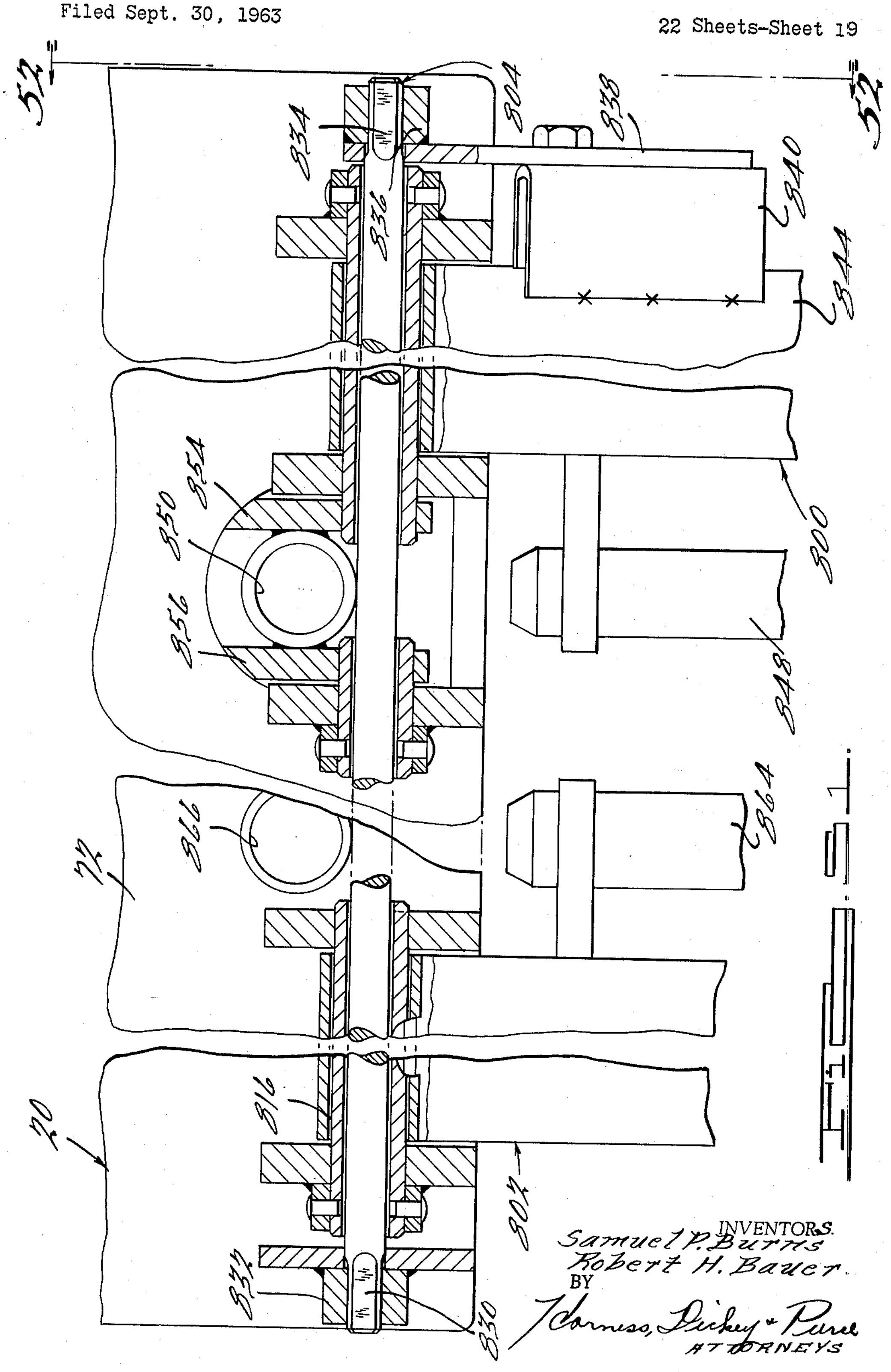
FIGURE 51 is a cross sectional view taken substantially along the line 51—51 of FIGURE 1.
Figure 52:
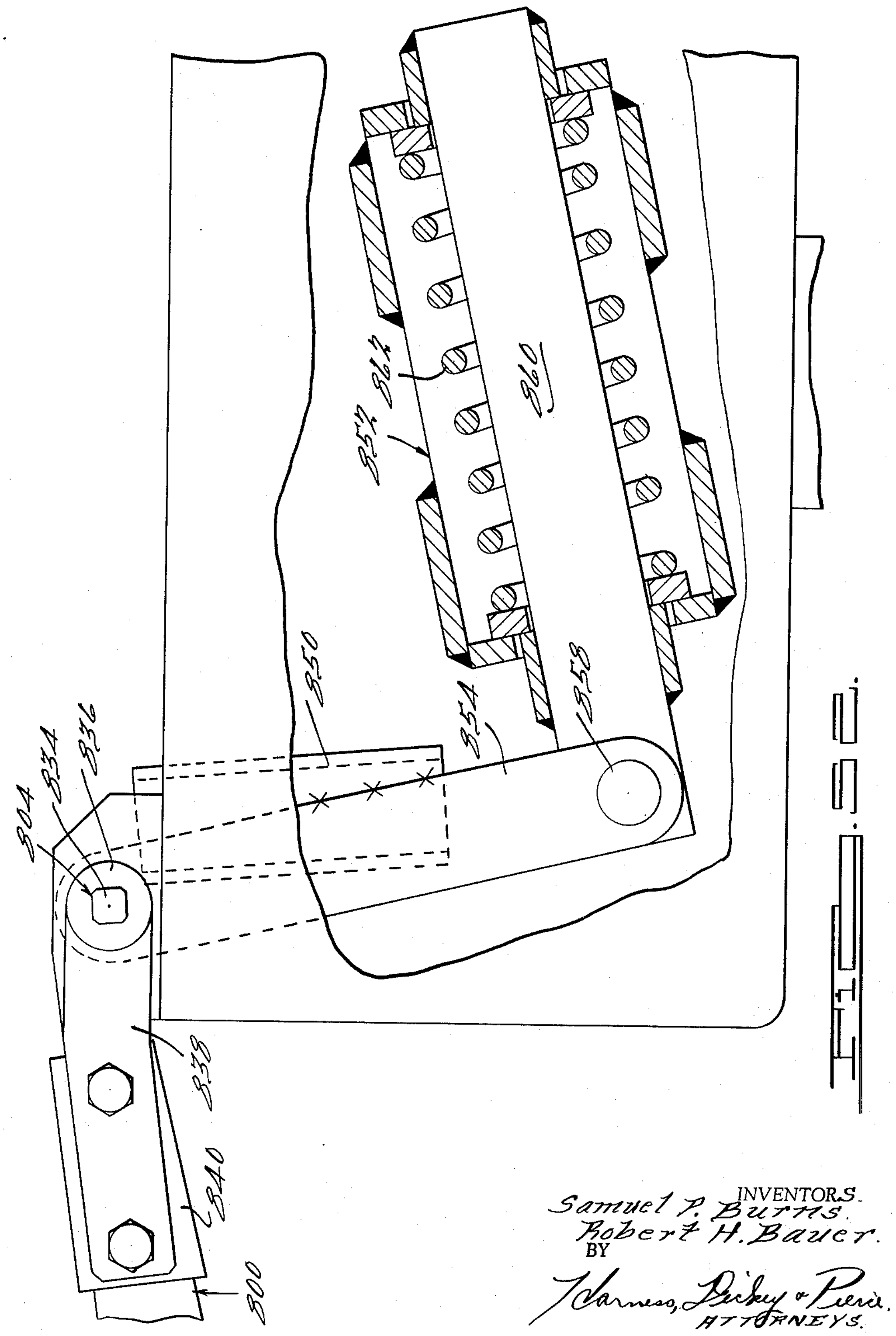
FIGURE 52 is a view, partially broken away, taken substantially along the line 52—52 of FIGURE 51.

As best seen in FIGURE 51 of the drawings, the bridge plates 800 and 802 are pivotally supported by the transverse torsion bar or shaft 804. The shaft 804 has a square end portion 830 that is accepted in a complementary nut 832 which is secured to the deck plate 72 of the railcar 20. The opposite end portion 834 of the shaft 804 is of square cross section and is accepted within a complementary nut 836 which in turn is secured, as by welding, to a lever 838. The lever 838 has a generally U-shaped saddle member 840 secured thereto and to an edge portion 844 of the bridge 800 to control movement thereof about the shaft 804.

The angular relationship of the bridge plate 800 and the torsion bar 804 is such that when the bridge plate 800 is disposed vertically or in other words at right angles to the deck plate 72 of the railcar 20, the torsion bar 804 is unstressed. However, when the bridge plate 800 is rotated to the generally horizontal position, the end portion 34 of the torsion bar 804 is rotated 90° torsionally loading the bar 804 and effecting a counterbalancing of the bridge plate 800 to facilitate elevation thereof when desired. The relatively small bridge plate 802 is merely journaled about the shaft 804.

The bridge plate 800 is secured in the vertical position by a pin 848 that is advanceable into a complementary scabbard 850. Because the plate 800 is relatively heavy, the scabbard 850 is rotatable about the shaft 804, rotation being controlled by a shock absorber or buffer assembly 852. The buffer assembly 852 comprises a pair of arms 854 and 856 for the support of the scabbard 850 which are pivotally secured as by a pin 858 to a shock absorber shaft 860. Movement of the shaft 860 in either direction is controlled by a spring 862 thereby to effect control of the bridge plate 800 when the pin 848 thereof is engaged within the scabbard 850.

It is to be noted that the relatively small bridge plate 802 is provided with a pin 864 that is acceptable in a complementary rigidly mounted scabbard 866 to retain the bridge plate 802 in the retracted condition.

Figures 53, 54, 55, 56:
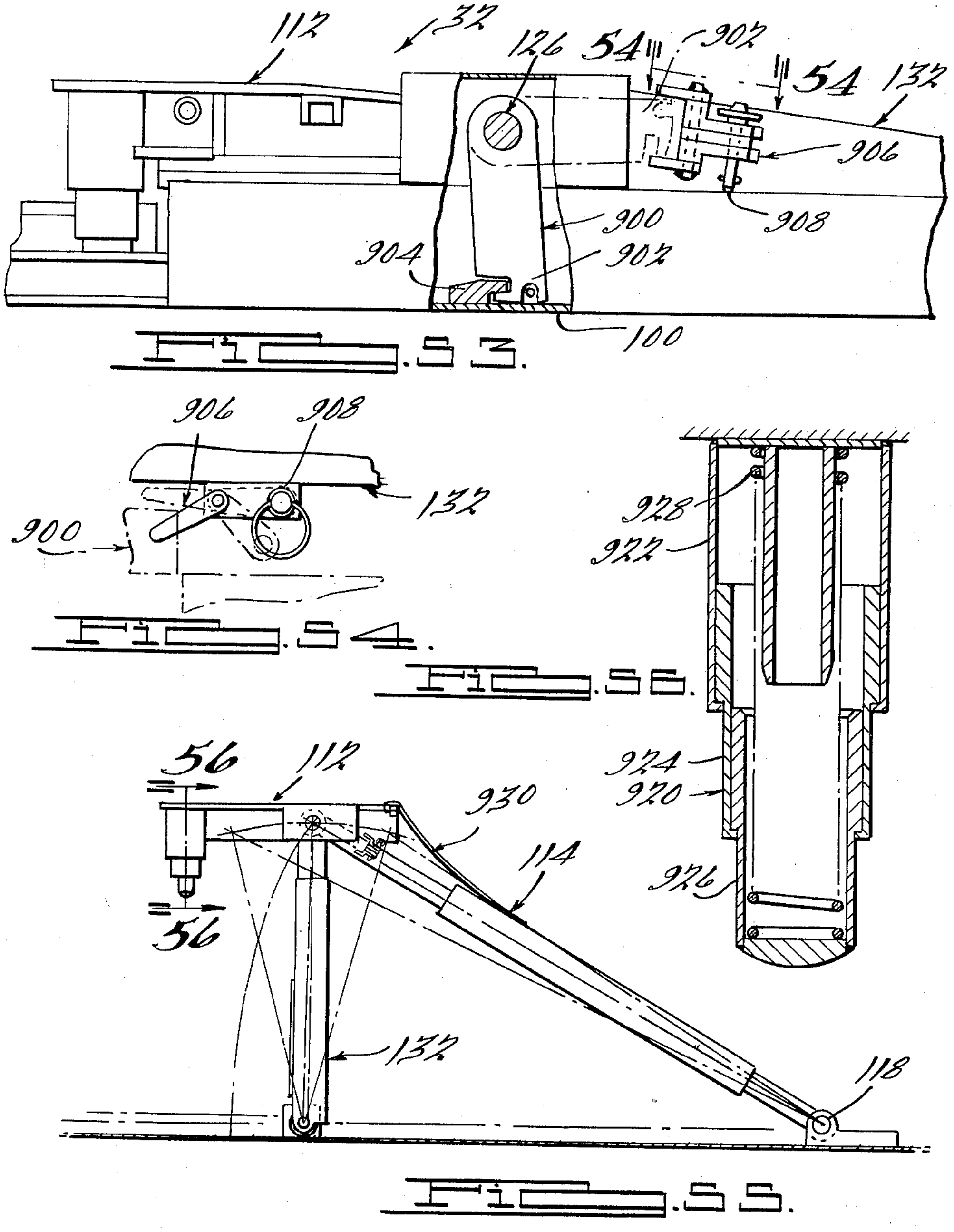
FIGURE 53 is a view taken in the direction of the arrow 53 of FIGURE 17.
FIGURE 54 is a view taken substantially along the line 54—54 of FIGURE 53.
FIGURE 55 is a diagrammatic view of the hitch in the elevated condition showing movement of the coupler thereof due to shock loads.
FIGURE 56 is a cross sectional view taken substantially along the line 56—56 of FIGURE 55.

As best seen in FIGURE 53 of the drawings, the hitch 32 is supported in the Flexi-Van condition by a pair of relatively short legs one of which is shown and designated by the numeral 900. The leg 900 is pivotally secured to the coupler 112 by the pin 126 which also pivotally couples the strut arm 14 and leg 132 to the coupler assembly 112.

The leg 900 is provided with a lower end portion 902 of what may be termed "gooseneck" configuration that is engageable with a complementary locking plate 904 which is secured to the base plate 100 of the hitch 32, as by welding.

As best seen in FIGURE 54, the leg 900 is secureable in the retracted condition against the leg 132 by a latch mechanism 906. A retractable pin 908 locks the latch mechanism 906 and leg 900 in the retracted condition when the hitch 32 is in the fully retracted or fully elevated position.

As best seen in FIGURE 55 of the drawings, the upper coupler 112 is movable fore and aft about the pins 136 and 138 at the lower end of the legs 130 and 132 to accommodate shock loads on a piggyback container or trailer. The shock absorbing assembly of the strut leg 114 discussed hereinbefore, accommodates this movement.

As best seen in FIGURE 56, a helper spring assembly 920 is secured to opposite sides of the coupler 112 to facilitate initial elevation thereof. The helper assembly 920 comprises a plurality of telescoping sections 922, 924 and 926 having a spring 928 disposed centrally thereof to normally bias the lowermost tubular section 926 to the extended condition. When the coupler 112 is in the fully collapsed condition the assembly 920 is fully collapsed. As the coupler 112 begins to rise due to rotation of the lead screw 136, the spring assembly 920 facilitates initial elevation.

Figure 57:
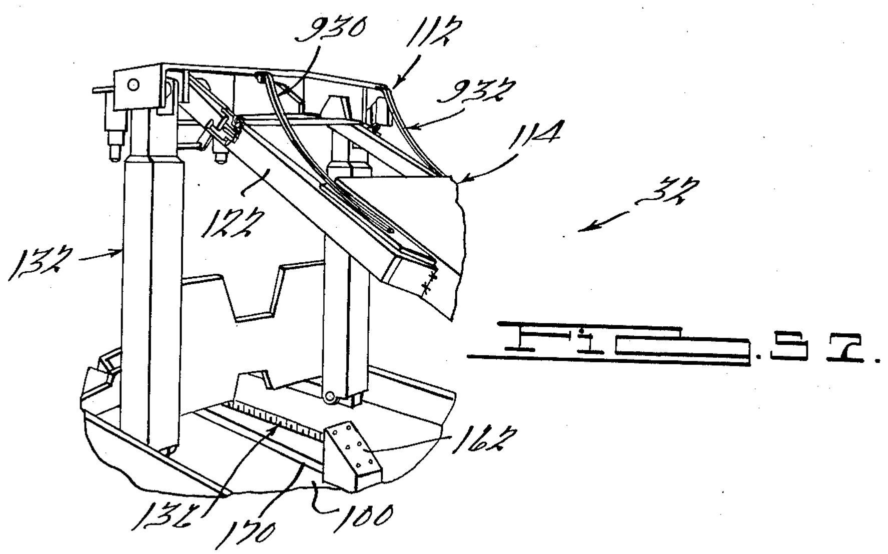
FIGURE 57 is a fragmentary perspective view of the hitch in the elevated condition.

As best seen in FIGURES 11 and 57, a pair of cantilevered springs 930 and 932 extend between brackets 934 and 936 on the coupler 112 and the strut leg 114 to maintain the coupler 112 in the generally horizontal condition as it moves between selected vertical positions. In the absence of the springs 930 and 932 the coupler 112 would rotate about the pins 126 and 124 due to its own weight and thereby render coupling of the kingpin of a piggyback trailer therewith relatively difficult.

Figure 29:
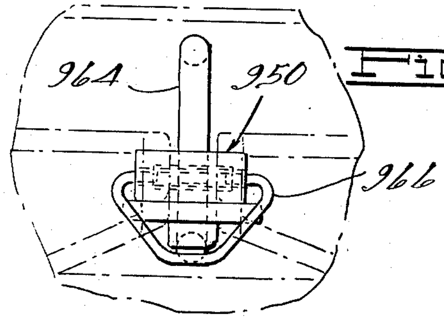
FIGURE 29 is a view taken substantially along the line 29—29 of FIGURE 27.

As best seen in FIGURES 27, 28 and 29, the arms 508 of the turntable 36 are secureable in the folded condition relative to the outer frame 500 of the turntable 36 by a latch mechanism 950 comprising a lower element 952 having a pair of ears 954 and 956 thereon and an upper element 958 having ears 960 and 962 thereon. The elements 950 and 958 are retained on a ring 964 which is secured to the outer frame 500 of the turntable 36 as by welding. The elements 950 and 958 are secureable to one another as by a ring 966.

Figure 5:
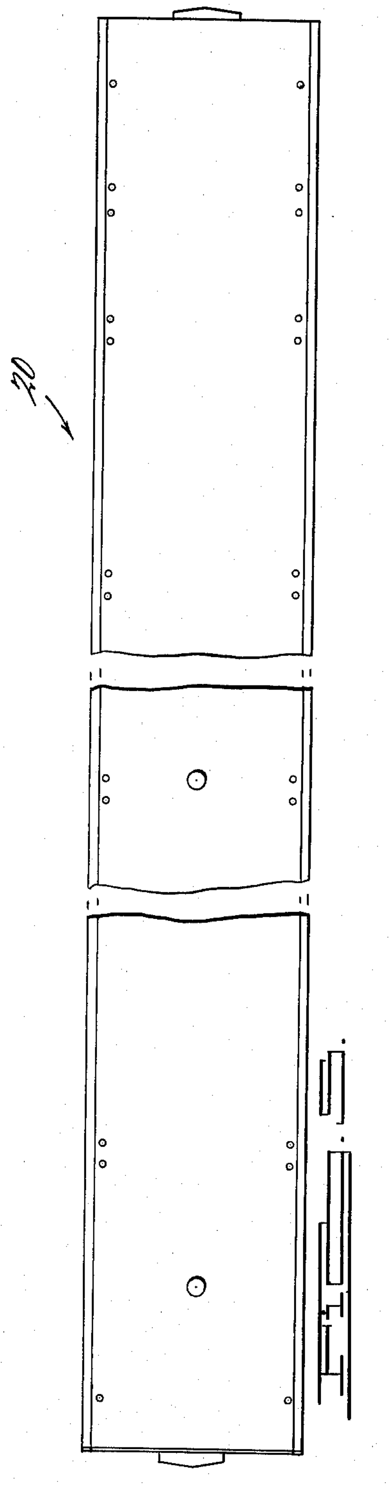
FIGURE 5 is a top plan view of the multi-purpose railcar showing the disposition of the lift on-lift off container supports with the turntable, hitch and wheel guide curbs removed therefrom.

If it is desired to utilize the railcar 20 as a flat car totally devoid of above deck apparatus the turntable 36 and 38 and hitches 32 and 34 and wheel guide curbs 24, 26, 28 and 30 are removed therefrom resulting in a flat deck substantially as shown in FIGURES 5 and 6 of the drawings.

Normally, however, the railcar 20 can be utilized even as a flat car with the hitches 32 and 34, turntable 36 and 38 and other accessories secured thereto because of the minimum above height of these pieces of special purpose equipment.

As best seen in FIGURE 1 of the drawings when the railcar 20 is conditioned for use in the piggyback mode the hitch 32 is first elevated and a piggyback trailer rolled onto the car 20. The hitch 34 is then elevated to accommodate a second piggyback trailer or, alternatively, elevated to the intermediate condition for the acceptance of a Flexi-Van container, this loading condition is shown in FIGURE 3 of the drawings.

From the foregoing description it should be apparent that the multi-purpose railcar of the instant invention offers a step forward in the railcar art since it permits a shipper to use a single railcar where a number of railcars have heretofore been required. Versatility of the railcar of the instant invention is maximized by the use of the multi-purpose hitch which not only supports the kingpin of a piggyback trailer but also supports and in addition swings to accept the kingpin of a Flexi-Van container.

The turntable of the herein discussed railcar features a novel locking mechanism that is triggered by sensing the position of the Flexi-Van container. The turntable also features a secondary shock mount system that protects the lading as well as the Flexi-Van container from excessive shock and vibration. The turntable is foldable to lie between the wheels of a piggyback trailer.

The railcar 20 also features a number of improvements that contribute to the versatility thereof. For example, the bridge plates at opposite ends of the car are supported by a novel torsion bar assembly that minimizes the effort required to rotate the bridge plates between a loading and a rolling condition. Furthermore, the railcar is provided with a number of novel locking and retaining structures for the turntable, hitch, chains and lift on-lift off container coupler.

It is to be understood that the specific constructions of the improved railcar herein diclosed and described are presented for the purpose of explanation and illustration and are not intended to indicate the limits of the invention, the scope of which is defined by the following claim.

What is claimed is:

An elongated railcar comprising, a generally flat deck having a turntable on said deck for the acceptance of one end of a shipping container, and means spaced longitudinally from said turntable and rotatable about a vertical axis to a laterally extending position for engagement and support of the other end of the shipping container while the container is angularly related to the railcar, said turntable and said means being concomitantly rotatable about vertical axes to move the container into alignment with the railcar.

References Cited by the Examiner

UNITED STATES PATENTS

| | | | |
|---|---|---|---|
| 1,537,162 | 5/25 | Fowler | 105—455 |
| 2,788,751 | 4/57 | Russell | 105—458 |
| 2,859,710 | 11/58 | Elsner | 105—369 |
| 2,891,490 | 6/59 | Elsner | 105—369 |
| 2,898,872 | 8/59 | Hastings | 105—366 |
| 2,933,052 | 4/60 | Mellam | 105—368 |
| 2,933,053 | 4/60 | Mellam | 105—368 |
| 3,004,500 | 10/61 | Johnson | 105—458 |
| 3,033,129 | 5/26 | De Grandpre | 105—368 |
| 3,041,028 | 6/62 | McDowell | 248—119 |
| 3,075,479 | 1/63 | Goby | 105—455 |
| 3,102,497 | 9/63 | Candlin et al. | 105—368 |
| 3,127,142 | 3/64 | Bock | 248—119 |
| 3,129,672 | 4/64 | Gutridge et al. | 105—366 |

MILTON BUCHLER, *Primary Examiner.*

LEO QUACKENBUSH, *Examiner.*